(12) United States Patent
Hiroe et al.

(10) Patent No.: US 7,088,853 B2
(45) Date of Patent: Aug. 8, 2006

(54) ROBOT APPARATUS, METHOD AND DEVICE FOR RECOGNITION OF LETTERS OR CHARACTERS, CONTROL PROGRAM AND RECORDING MEDIUM

(75) Inventors: Atsuo Hiroe, Kanagawa (JP); Katsuki Minamino, Tokyo (JP); Kenta Kawamoto, Tokyo (JP); Kohtaro Sabe, Tokyo (JP); Takeshi Ohashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 10/336,201

(22) Filed: Dec. 31, 2002

(65) Prior Publication Data

US 2003/0152261 A1    Aug. 14, 2003

Related U.S. Application Data

(63) Continuation of application No. PCT/JP02/04378, filed on May 1, 2002.

(30) Foreign Application Priority Data

May 2, 2001    (JP)    ............................. 2001-135423

(51) Int. Cl.
*G06K 9/00*    (2006.01)
*G10L 15/00*   (2006.01)
*G10L 13/00*   (2006.01)

(52) U.S. Cl. ..................... 382/153; 704/251; 704/260
(58) Field of Classification Search ................ 382/153, 382/114; 704/251, 260
See application file for complete search history.

(56) References Cited

U.S. PATENT DOCUMENTS

| | | | | |
|---|---|---|---|---|
| 4,884,972 A * | 12/1989 | Gasper | ...................... | 434/185 |
| 5,062,047 A * | 10/1991 | Tanaka et al. | .................. | 704/3 |
| 5,268,990 A * | 12/1993 | Cohen et al. | ............... | 704/200 |
| 5,577,164 A * | 11/1996 | Kaneko et al. | ............. | 704/275 |
| 5,640,488 A * | 6/1997 | Junqua et al. | ............. | 704/245 |
| 5,673,362 A * | 9/1997 | Matsumoto | ................ | 704/260 |
| 5,737,490 A * | 4/1998 | Austin et al. | ............... | 704/256 |
| 5,799,276 A * | 8/1998 | Komissarchik et al. | ..... | 704/251 |
| 5,920,838 A * | 7/1999 | Mostow et al. | ............. | 704/255 |
| 6,052,663 A * | 4/2000 | Kurzweil et al. | ........... | 704/260 |
| 6,243,680 B1 * | 6/2001 | Gupta et al. | ............... | 704/260 |
| 6,249,763 B1 * | 6/2001 | Minematsu | ................ | 704/252 |
| 6,347,300 B1 * | 2/2002 | Minematsu | ................ | 704/270 |
| 6,466,847 B1 * | 10/2002 | Horst | ......................... | 701/29 |
| 2002/0138265 A1 * | 9/2002 | Stevens et al. | ............. | 704/251 |

FOREIGN PATENT DOCUMENTS

| | | |
|---|---|---|
| JP | 8-83092 | 3/1996 |
| JP | 9-65176 | 3/1997 |
| JP | 10-83195 | 3/1998 |

* cited by examiner

*Primary Examiner*—Wenpeng Chen
*Assistant Examiner*—Utpal Shah
(74) *Attorney, Agent, or Firm*—Frommer Lawrence & Haug LLP; William S. Frommer

(57) ABSTRACT

A plural number of letters or characters, inferred from the results of letter/character recognition of an image photographed by a CCD camera (20), a plural number of kana readings inferred from the letters or characters and the way of pronunciation corresponding to the kana readings are generated in an pronunciation information generating unit (150) and the plural readings obtained are matched to the pronunciation from the user acquired by a microphone (23) to specify one kana reading and the way of pronunciation (reading) from among the plural generated candidates.

17 Claims, 19 Drawing Sheets

| WORD SYMBOL | PLU SEQUENCE |
|---|---|
| 五反田 | g o t a N d a |
| 電車 | d e N sh a |
| に | n i |
| 行き | i k i |
| たい | t a i |
| ⋮ | ⋮ |

FIG.4

| WORDS | READING | ATTRIBUTES |
|---|---|---|
| 品川 | しながわ | <PLACE NAME> |
| 北品川 | きたしながわ | <PLACE NAME> |
| 青物横丁 | あおものよこちょう | <PLACE NAME> |
| ⋮ | ⋮ | ⋮ |
| 佐藤 | さとう | <SURNAME> |
| 鈴木 | すずき | <SURNAME> |
| ⋮ | ⋮ | ⋮ |
| すべすべ饅頭蟹 | すべすべまんじゅうがに | <ANIMAL> |
| 大錨海鼠 | おおいかりなまこ | <ANIMAL> |
| ⋮ | ⋮ | ⋮ |

FIG.5

| WORD | READING |
|---|---|
| 北 | きた、ホク |
| 品 | しな、ヒン、ホン |
| 川 | かわ、セン |
| 比 | くら、ヒ |
| 晶 | あきら、ショウ |
| ⋮ | ⋮ |
| ? | はてな、クエスチョン |
| @ | アット |
| ⋮ | ⋮ |
| A | エー、ア |
| B | ビー、ブ |
| ⋮ | ⋮ |

FIG.6

| WORD SYMBOL | PLU SEQUENCE |
|---|---|
| 北品川 | k i t a sh i n a g a w a |
| 北晶川 | h i sh o: k a w a |
| 比晶川 | k u r a a k i r a g a w a |

FIG.8

| node 100 | INTPUT EVENT NAME | DATA NAME | DATA RANGE | PROBABILITY OF TRANSITION TO OTHER NODES Di | | | | ... | |
|---|---|---|---|---|---|---|---|---|---|
| | | | | A | B | C | D | | n |
| NODE OF DESTINATION OF TRANSITION | | | | node 120 | node 120 | node 1000 | | | node 600 |
| OUTPUT BEHAVIOR | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | 50% | | | |
| 6 | | JOY | 50.100 | | | 100% | | | |
| 7 | | SURPRISE | 50.100 | | | | | | |
| 8 | | SADNESS | 50.100 | | | | | | |

ROBOT APPARATUS, METHOD AND DEVICE FOR RECOGNITION OF LETTERS OR CHARACTERS, CONTROL PROGRAM AND RECORDING MEDIUM

This is a continuation of copending International Application PCT/JP02/04378 having an international filing date of May 1, 2002.

TECHNICAL FIELD

This invention relates to a robot apparatus, acting autonomously based on an inner state of robot apparatus, letter/character recognition methods and device, a control program and to a recording medium. More particularly, it relates to a robot apparatus in which, as letters or characters are presented and a speech is uttered, the letters or characters are recognized from a photographed image and the speech acquired is newly registered in association with and as being the pronunciation of the letters or characters, to letter/character recognition methods and device in which, as letters or characters are presented and a speech is uttered, the letters or characters are recognized from a photographed image and the speech acquired is newly registered as being the pronunciation of the letters or characters, to a control program for allowing to execute a processing of recognizing the letters or characters, presented as a speech is uttered, and of newly registering the speech acquired as being the pronunciation of the letters or characters, and to a recording medium having the control program recorded thereon.

BACKGROUND ART

A mechanical apparatus performing the movement similar to the movement of the human being, as a living organism, using electrical or magnetic operations, is termed a robot. In this nation, the robot began to be used towards the end of sixties. The majority of the robots used were industrial robots, such as manipulators or transfer robots, aimed to automate productive operations in a plant for dispensing with human labor.

Recently, development of a utility robot, supporting the human life as a partner of the human being, that is, supporting the human activities in various situations of our everyday life, such as in living environment, is proceeding. In distinction from the industrial robot, the utility robot has the faculty of learning the method for adapting itself to the human users different in personality or to variable aspects in different situations of the human living environment. For example, legged mobile robots, such as a pet type robot, simulating the physical mechanism or the movements of four-legged animals, such as dogs or cats, or a humanoid robot, designed after the bodily mechanism of the human being, standing erect and walking on two legs, and after their behavior, are already being put to practical use. These legged mobile robots, having the appearance extremely close to that of the animal or the human being, capable of behaving similarly to the animals or the human being, in contradistinction from the industrial robots, and also of performing various entertainment-oriented actions, are sometimes called entertainment robots.

Among the legged mobile robots, there are those having small-sized cameras, equivalent to eyes, and sound collecting microphones, equivalent to ears. In this case, the legged mobile robots execute image processing on acquired images to recognize the surrounding environment, input as the image information, or to recognize the "language" from the input surrounding sound.

In particular, the technique of recognizing the speech, acquired form outside, for converting it into letters or characters, or of recognizing the speech to make a reply, is being used not only in the legged mobile robots but also in various electronic equipment, such as personal computers.

In conventional speech recognition techniques, a dictionary for speech recognition (referred to below as a dictionary for recognition), in which the pronunciation of a given word is stored in association with its notation, is used for speech recognition. This technique has a deficiency that a word not registered in the dictionary for recognition cannot be recognized. Moreover, in recognizing the pronunciation of a word sequence, such as a sentence, the words registered in the dictionary for recognition must be combined together. That is, if there is any word or words, not as yet registered in the dictionary for recognition, is contained in a sentence, such sentence is misrecognized, or cannot be recognized.

Taking an example of "北品川 (name of a station, uttered as kita shinagawa)", if "北品川" has not been registered in the dictionary for recognition, the pronunciation of "北品川" or the pronunciation containing "北品川", such as the speech comprised of a sequence of words, e.g., "北品川は、どこですか。(Where is Kitshinagawa?, uttered as kitashinagawawa, dokodesuka) "cannot be recognized, or the portion of "北品川" is misrecognized. Thus, for allowing to recognize words not registered in the dictionary for recognition, unregistered words need to be registered anew additionally.

In the dictionary for recognition, owned by the speech recognition device for enabling speech recognition, a "word symbol" for a given word, as an identifier for distinguishing the word from other words, is associated with a "PLU sequence" representing the pronunciation information for the word in question. The PLU (phoneme-like unit) is to be an acoustic or phonetic unit. The speech uttered can necessarily be expressed as a combination of PLUs (PLU sequence).

Therefore, if a word is to be registered in the dictionary for recognition, it is only necessary to add a word symbol and an associated PLU sequence. It is noted however that, in order for a word symbol and an associated PLU sequence to be added in this manner, the notation of "北品川" or "kitashinagawa" needs to be able to be input directly, using suitable inputting means, such as a keyboard.

Thus, in case of e.g., a robot apparatus not having such inputting means, e.g., a keyboard, there is such a method in which the pronunciation of a word acquired as speech is acoustically recognized to obtain a PLU sequence for an unknown word. In this case, recognition is with use of a garbage model. The garbage model, applied only to Japanese, is such a model in which the speech is represented as a combination of "phonemes" as basic unit for pronunciation, or as a combination of kana (Japanese syllabary) as basic units for word reading.

In a conventional speech recognition device, a garbage model is applied to obtain the results of recognition by speech, a word symbol is applied to the results of recognition and these are associatively registered as a new word in the dictionary for recognition.

It should be noted that the "phoneme" and "PLU" are approximately synonymous and that the "PLU sequence" represents the pronunciation of a word formed by concatenation of plural PLUs.

The conventional technique for speech recognition, applying the garbage model, has a deficiency that recognition accuracy tends to be lowered by a delicate difference in the way of pronunciation from user to user, even though the words uttered is the same, by weakness of particular phonemes, such as /s/ in a beginning part of the word, that are necessarily liable to be misrecognized, due to changes in the phonemes caused by surrounding noise, or due to failure in detecting the speech domains.

In particular, if the speech recognition device is applied to the robot apparatus, the speech collecting microphone on the side speech recognition device is separated away from the user, in a majority of cases, so that mistaken recognition is likely to be produced frequently.

In case "きたしながわ (name of a station, uttered as kita shinagawa)" is to be recognized, the result of recognition tends to be recognized as being for example a PLU sequence "hitotsunanoga" or "itasunaga:" which is analogous with but is not the same as "きたしながわ" in pronunciation. If speech recognition is performed using a dictionary for recognition, the word registration of which has been made by such method, not only is the recognition accuracy lowered, but also display errors due to mistaken recognition is produced. That is, since incorrect PLU sequences are conferred to newly registered words, the accuracy with which this word is recognized is lowered.

In case the other user than the user who input a word utterd the word, even though "きたしながわ" has been registered in the dictionary for recognition, there were occasions where the pronunciation containing the word "きたしながわ" can not be recognized due to a difference in an accent from user to user.

Moreover, if the results of speech recognition are converted into letters or characters for display, there are occasions where mistaken letters or characters are demonstrated, because the information as to display has not been conferred to the newly registered word. If, after registering "きたしながわ" with speech, the user uttered "北品川に行きたい。(I want to go to Kitashinagawa, uttered as kitashinagawa ni yukitai)" to the speech recognition device, the display may be "hitotsunan-oga に行きたい(I want to go to hitotsunanoga, uttered as hitotsunanoga ni yukitai)" or "ひとつなのが行きたい (I want to go to hitotsunanoga, uttered as hitotsunanoga ni yukitai)", even though the pronunciation "きたしながわ" has correctly been recognized by the speech recognition device. There is also an inconvenience that, when the speech recognition device repeats the PLU sequence as the results of recognition by speech synthesis, only the portion of the PLU sequence of the synthesized newly recognized word be uttered as an unnatural junction in the entire PLU sequence.

Additionally, if a new word is registered by the garbage model, it is not possible to register the information concerning the attributes of the registered word, such as part-of-speech or meaning. For example, if "北品川" has been registered, it is not possible to register the information as to whether the word is a noun or a place name. The result is that, if the grammatical rule for particular expressions, such as "<地名を表す語>+は +どこ+です+か (where is the <word indicative of place name>?, uttered as <chimeiwo arawasugo>+wa+doko+desu+ka)" is pre-recorded in for example the grammar for dialog or a language model for recognition, such rule cannot be applied to the newly registered word. Although word attributes can be input with speech, at the time of registration, the user is required to be aware of the word attributes. Moreover, it is troublesome for the user to input not only the word but also the word attribute for registration.

DISCLOSURE OF THE INVENTION

In view of the above-depicted status of the art, it is an object of the present invention to provide a robot apparatus in which letters or characters are recognized from a photographed image, the speech uttered with the so presented letters or characters is acquired and recognized as being the pronunciation for the letters or characters to enable an unregistered word to be registered as a new word in a dictionary for recognition, and in which the newly registered word can be recognized correctly. It is another object of the present invention to provide a letter/character recognition device in which letters or characters are recognized from a photographed image, the speech uttered with the so presented letters or characters are acquired and recognized as being the pronunciation for the letters or characters to enable an unregistered word to be registered as a new word in a dictionary for recognition, and in which the newly registered word can be recognized correctly. It is still another object of the present invention to provide a letter/character recognition method including imaging letters or characters presented, recognizing the letters or characters from the photographed image, acquiring the speech uttered with the letters or characters so presented, and recognizing the speech uttered with the presentation as being the pronunciation of the letters or characters acquired and recognized for registration as a new word in the dictionary for registration. It is yet another object of the present invention to provide a control program for allowing to execute the processing of recognizing the letters or characters and for newly registering the acquired speech as being the pronunciation of the letters or characters, and a recording medium having this control program recorded thereon.

For accomplishing the above object, the present invention provides a robot apparatus acting autonomously based on an inner state of the robot apparatus, including storage means for speech recognition, as a dictionary for speech recognition, having stored therein the relationship of correspondence between a word and the pronunciation information thereof, word sound expression storage means, as a table for word sound expressions, having stored therein the relationship of correspondence between the word and the phonograms thereof, imaging means for photographing an object, image recognition means for extracting the predetermined patterns of images from the image photographed by the imaging means, sound collecting means for acquiring the surrounding sound, speech recognition means for recognizing the speech from the sound collected by the sound collecting means, reading information generating means for conferring plural phonograms, inferred from the predetermined patterns of images extracted by the letter/character recognition means, based on the table for word sound expressions, and for generating the pronunciation information for each of the plural phonograms or characters thus conferred, and storage controlling means for comparing the pronunciation information generated by the reading information generating means with the speech features extracted from the input speech and newly storing the entry with the closest pronunciation information in the dictionary for speech recognition as being the pronunciation information corresponding to the pattern recognition result extracted by said image recognition means.

With the present robot apparatus, plural phonograms, inferred from the predetermined patterns of images extracted by the image recognition means, are conferred, based a word pronunciation table, the pronunciation information equivalent to the reading are generated, for each of the conferred plural word reading expressing letters, each pronunciation information generated in the pronunciation information generating means is compared to the speech information of the speech recognized by the speech recognition means and the closest pronunciation information is newly stored as being the pronunciation information corresponding to the pattern recognition result extracted by said image recognition means.

The present invention also provides a letter/character recognition device including storage means for speech recognition, as a dictionary for speech recognition, having stored therein the relationship of correspondence between a word and the pronunciation information thereof, word sound expression storage means, as a table for word sound expressions, having stored therein the relationship of correspondence between the word and the word reading expressing letters thereof, imaging means for photographing an object, image recognition means for extracting the predetermined patterns of images from the image photographed by the imaging means, sound collecting means for acquiring the surrounding sound, speech recognition means for recognizing the speech from the sound collected by the sound collecting means, reading information generating means for conferring plural word reading expressing letters, inferred from the predetermined patterns of images extracted by the image recognition means, based on the table for word sound expressions, and for generating the pronunciation information for each of the plural word reading expressing letters or characters thus conferred, and storage controlling means for comparing the pronunciation information generated by the reading information generating means to the speech information of the speech recognized by the speech recognition means and for newly storing the closest pronunciation information in the dictionary for speech recognition as being the pronunciation information corresponding to the pattern recognition result extracted by said image recognition means.

With the letter/character recognition device, plural phonograms, inferred from the predetermined patterns of images extracted by the image recognition means, are conferred, based a table of word reading expressing letters, the pronunciation information are generated, for each of the conferred plural word reading expressing letters, each pronunciation information generated in the pronunciation information generating means is compared to the speech information of the speech recognized by the speech recognition means, and the closest pronunciation information is newly stored as being the pronunciation information corresponding to the pattern recognition result extracted by said image recognition means.

The present invention also provides a letter/character recognition method including an imaging step of imaging an object, an image recognition step of extracting predetermined patterns of images from an image photographed by the imaging step, a sound collecting step of collecting the surrounding sound, a speech recognition step of recognizing the speech from the sound acquired by the sound collecting step, a reading information generating step of conferring plural word reading expressing letters, inferred from the letters or characters extracted by the letter/character recognition means, based on a table for word sound expressions, having stored therein the relationship of correspondence between a word and a sound expressing letter/character for the word, and of generating the pronunciation information and a speech information corresponding to the reading for each of the plural word reading expressing letters or characters, thus conferred, and a storage controlling step of comparing the pronunciation information generated by the reading information generating step to the speech information of the speech recognized by the speech recognition step and of newly storing the closest pronunciation information in the dictionary for pronunciation recognition as being the pronunciation information corresponding to the pattern recognition result extracted by said image recognition step.

With the letter/character recognition method, plural phonograms, inferred from the predetermined pattern of images extracted by the image recognition means, are conferred, based a table of word reading expressing letters, the pronunciation information is generated, for each of the conferred plural word reading expressing letters, each pronunciation information generated in the pronunciation information generating step is compared to the speech information of the speech recognized by the speech recognition step and the closest pronunciation informatin is newly stored as being the pronunciation information corresponding to the pattern recognition result extracted by said image recognition step.

The present invention also provides a program for having a robot apparatus execute an imaging step of imaging an object, an image recognition step of extracting predetermined patterns of images from an image photographed by the imaging step, a sound collecting step of collecting the surrounding sound, a speech recognition step of recognizing the speech from the sound acquired by the sound collecting step, a reading information generating step of conferring plural word reading expressing letters, inferred from the predetermined patterns of images extracted by the image recognition step, based on a table for word sound expressions, having stored therein the relationship of correspondence between a word and a sound expressing letter/character for the word, and of generating the pronunciation information for each of the plural word reading expressing letters or characters, thus conferred, and a storage controlling step of comparing the pronunciation information generated by the reading information generating step to the speech information of the speech recognized by the speech recognition step and newly storing the closest pronunciation information in the dictionary for speech recognition as being the pronunciation information corresponding to the pattern recognition result extracted by said image recognition step. The above control program may also be recorded on a recording medium and provided in this form.

BRIEF DESCRIPTION OF THE DRAWINGS

FIG. 4 illustrates a dictionary for speech recognition of the robot apparatus as an illustrative structure of the present invention.

FIG. 5 illustrates a word reading attribute table of the robot apparatus as an illustrative structure of the present invention.

FIG. 6 illustrates a word letter or letter/character reading table of the robot apparatus as an illustrative structure of the present invention.

FIG. 8 illustrates a dictionary for new word recognition by the robot apparatus as an illustrative structure of the present invention.

FIG. 15 shows the status transition conditions for determining the action of the robot apparatus as an illustrative structure of the present invention.

BEST MODE FOR CARRYING OUT THE INVENTION

Figure 1:
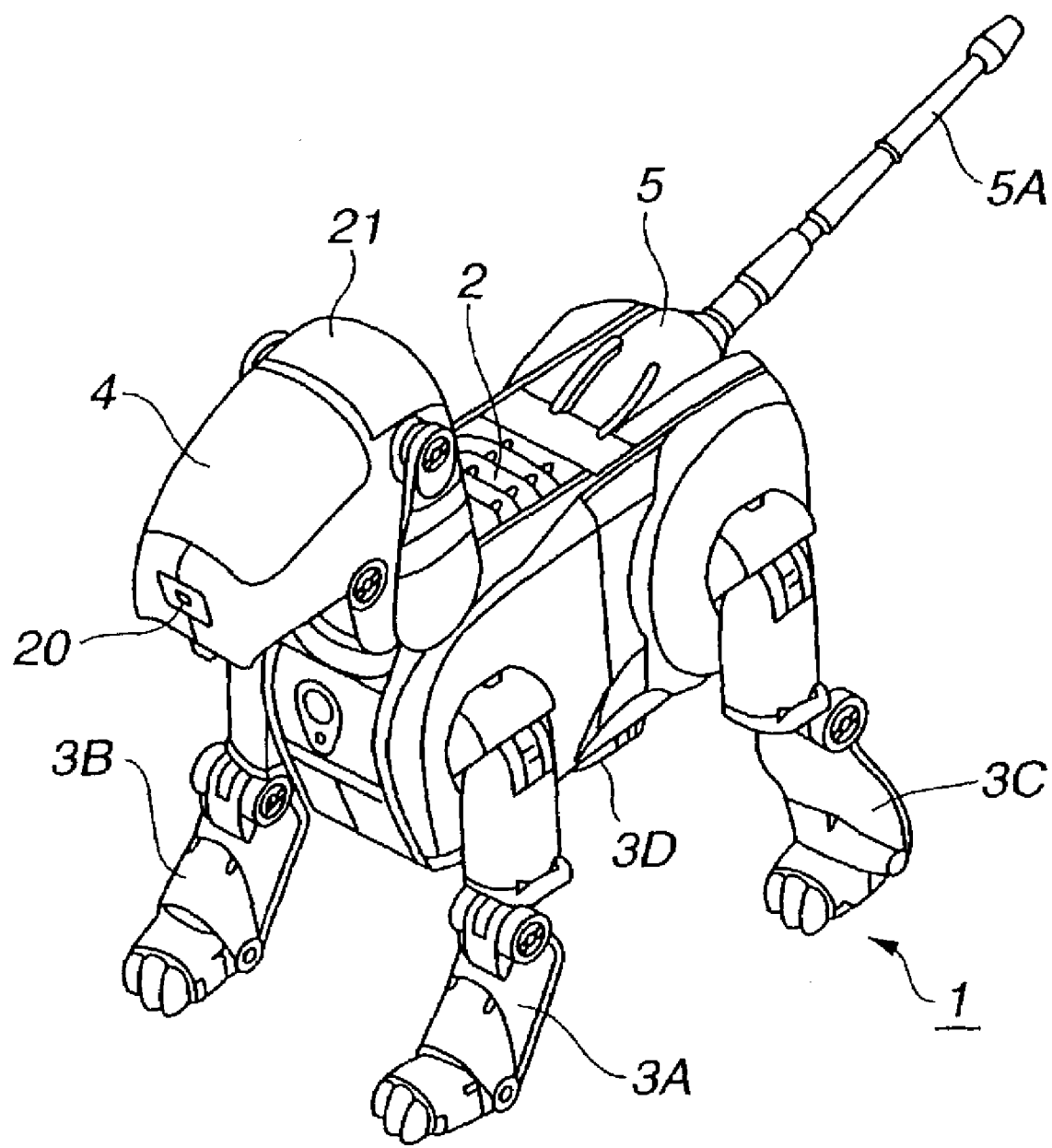
FIG. 1 is a perspective view showing the appearance of a robot apparatus as an illustrative structure of the present invention.

A robot apparatus, shown as an illustrative structure of the present invention, is a robot apparatus which acts autonomously based on an inner state of the robot apparatus. This robot apparatus is a legged movable robot having at least upper limbs, a body trunk and lower limbs, with the tipper and lower limbs or with only the lower limbs operating as movement means. Among the legged movable robots, there are a pet type robot simulating the physical mechanism of an animal moving on four legs, or its movement, and a robot apparatus simulating the bodily mechanism of an animal walking on two legs, that is an animal which uses only the lower limbs as movement means, or its movement. The robot apparatus, embodying the present invention, is a legged movable robot walking on its four legs.

This robot apparatus is a utility robot supporting the human activities in variable situations in the everyday life of the human being, as in living environment. It is an entertainment robot that is able not only to act based on an inner state of the robot apparatus, such as anger, sadness, joy or delight, but also to express basic movements made by the animals walking on its four legs.

Specifically, this robot apparatus simulates a "dog" and includes a head, body trunk, upper limbs, lower limbs, a tail etc. In connecting portions and joints of respective body portions, there are provided a preset number of actuators and potentiometers corresponding to the degrees of freedom of movements. The targeted movements may be achieved under control by a controller, not shown.

The robot apparatus includes an imaging unit for acquiring surrounding states as image data, a microphone unit for collecting the ambient speech and a variety of sensors for detecting the operation from outside. As the imager, a small-sized CCD (charge-coupled device) unit is used.

The robot apparatus, embodying the present invention, includes a image recognizing device and a speech recognizing device, and extracts letter/characters from an image photographed by the CCD camera, while conferring plural ways of pronunciation (reading) in kana, estimated from the extracted letter/characters, and generating plural speech information, corresponding to the so afforded plural ways of pronunciation (reading) in kana. This speech information is compared to the speech information of the speech acquired by the microphone unit and the closest speech information is assumed to be the pronunciation information of the extracted letter/character for newly memorizing the information in a dictionary for speech recognition.

Referring to the drawings, a robot apparatus, shown as an illustrative structure of the present invention, is hereinafter explained.

In the present embodiment, the robot apparatus 1 is a so-called pet type robot simulating a "dog", as shown in FIG. 1. The robot apparatus 1 includes a trunk unit 2, leg units 3A, 3B, 3C and 3D, connected to the front, back, left and right sides thereof, a head unit 4, connected to the foremost part thereof, and a tail unit 5, connected to the rear end thereof.

The trunk unit 2 includes a controller 16, and a battery 17, operating as a power supply of the robot apparatus 1. The control 16 includes a CPU (central processing unit) 10, a DRAM (dynamic random access memory) 11, a flash ROM (read-only memory) 12, a PC (personal computer) card interfacing circuit 13 and a signal processing circuit 14, interconnected over an internal bus 15. Within the trunk unit 2, there are enclosed an angular acceleration sensor 18 and an acceleration sensor 19.

The head unit 4 includes a CCD (charge-coupled unit) camera 10, for imaging an external status, a touch sensor 21 for detecting the pressure from a physical action from a user, such as "patting" or "hitting", a distance sensor 22 for measuring the distance to an object, lying ahead, a microphone 23 for collecting the external sound, a loudspeaker 24 for outputting the speech, such as whining, and an LED (light emitting device), equivalent to an "eye" of the robot apparatus 1, at preset positions. The CCD camera 20 is able to image an object, lying in the direction in which the head unit 4 is oriented, with a preset angle of view.

At the joint portions of the leg units 3A to 3D, connecting portions between the leg units 3A to 3D and the trunk unit 2, connecting portions between the head unit 4 and the trunk unit 2, and at connecting portions between the tail unit 5 and a tail 5A, there are provided a number of actuators $25_1$ to $25_n$ and a number of potentiometers $26_1$ to $26_n$, corresponding to the number of the degrees of freedom. The actuators $25_1$ to $25_n$ are comprised of, for example, servo motors. The leg units 3A to 3D are controlled by the driving of the servo motor so as to transfer to a targeted orientation or movement.

The various sensors, namely the acceleration sensor 18, acceleration sensor 19, touch sensor 21, distance sensor 22, microphone 23, loudspeaker 24 and the potentiometers $26_1$ to $26_n$, LEDs and the actuators $25_1$ to $25_n$ are connected to the signal processing circuit 14 of the controller 16 through associated hubs $27_1$ to $27_n$, respectively, while the CCD camera 20 and the battery 17 are directly connected to the signal processing circuit 14.

The signal processing circuit 14 sequentially captures sensor data, image data and speech data, supplied from the respective sensors, to store the data sequentially at preset locations in the DRAM 11 over internal bus 15. The signal processing circuit 14 also captures residual battery capacity data from the battery 17 for storage at preset locations in the DRAM 11.

The sensor data, image data, speech data and the residual battery capacity data, thus stored in the DRAM 11, are used when the CPU 10 manages operational control of the robot apparatus 1.

At an initial stage when the power supply of the robot apparatus 1 is turned on, the CPU 10 reads out the control program stored in a flash ROM 12 for storage in the DRAM 11. Alternatively, the CPU 10 reads out a control program, stored in a semiconductor memory device, loaded in the PC card slot, not shown, of the trunk unit 2, such as a memory card 28, via PC card interfacing circuit 13, for storage in the DRAM 11.

Based on the sensor data, image data, speech data and on the residual battery capacity data, sequentially stored from the signal processing circuit 14 in the DRAM 11, the CPU 10 verifies its own status and the surrounding status as well as the possible presence of user's commands or actions from the user.

The CPU 10 also determines the action which is based on these verified results and the control program stored in the DRAM 11. Based on the verified results, the CPU 10 causes those actuators, from the actuators $25_1$ to $25_n$, which are needed, to cause the head unit 4 to be moved up and down or left and right, to move the tail of the tail unit 5 or to drive the leg units 3A to 3D to effect walking. The CPU 10 also causes speech data to be generated as needed to send the generated speech data through the signal processing circuit 14 to the loudspeaker 24. The CPU 10 also generates signals for commanding the LED to be turned on or off to turn the LED on or off.

The CPU 10, autonomously controlling the robot as described above, also actuates the robot responsive to a request from a dialog management unit 110.

By this basic structure, the robot apparatus 1 acts autonomously responsive to its own state, surrounding state and to commands or actions from the user.

Figure 3:
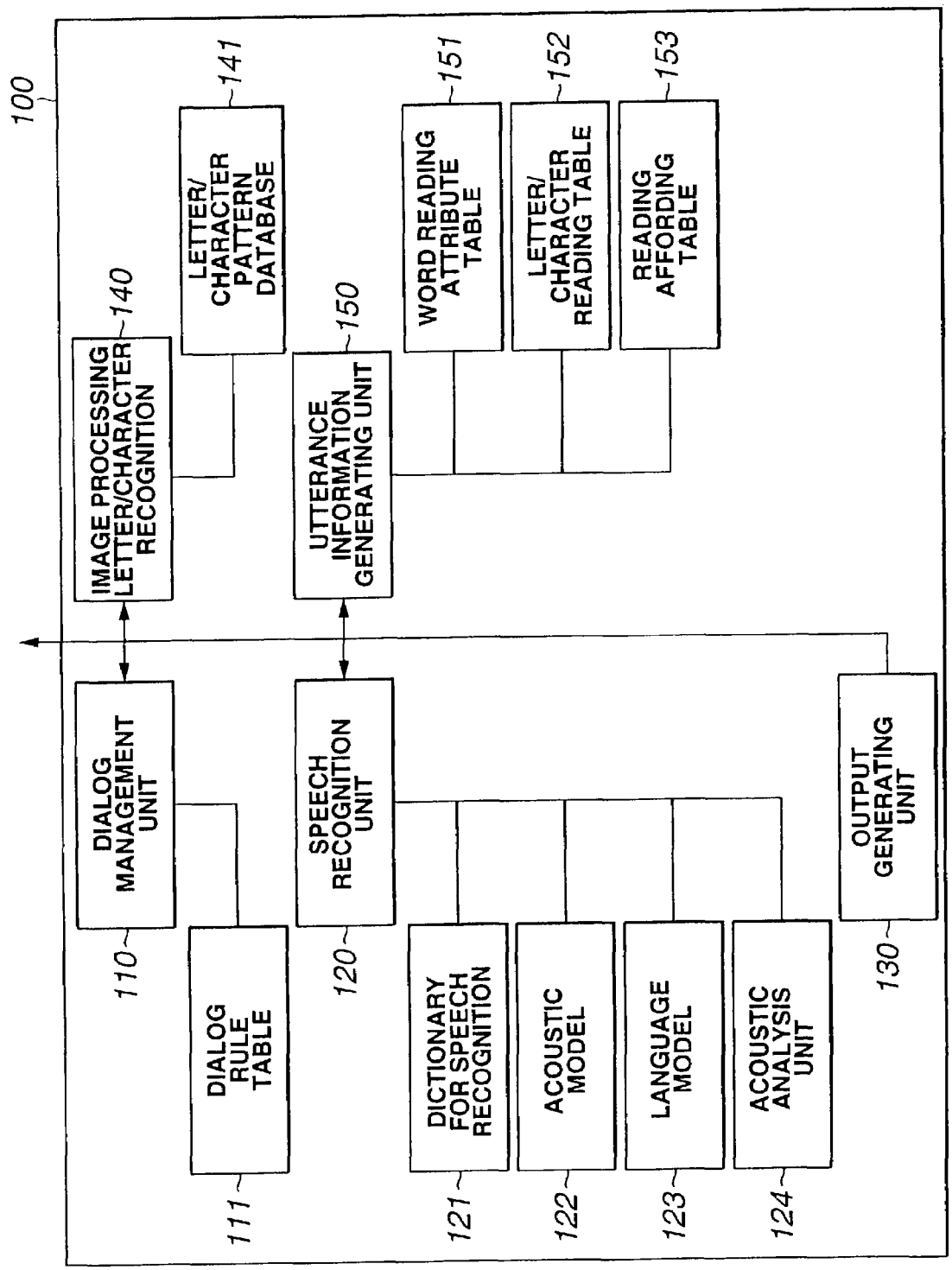
FIG. 3 is a block diagram showing the structure of a image speech recognition unit of the robot apparatus as an illustrative structure of the present invention.

The robot apparatus 1 also includes a image speech recognition unit 100, in the controller 16 of the trunk unit 2, as an arrangement for registering the correspondence between the recognized speech and the recognized letter/characters as newly recognized word. Referring to FIG. 3, the image speech recognition unit 100 includes a dialog management unit 10, a speech recognition unit 120, an output generating unit 130, a image processing letter/character recognizing unit 140 and a speech pronunciation information generating unit 150. Referring to FIG. 4, the dictionary for speech recognition is a table listing up "word symbols" as identifiers for making distinction from other words and a "PLU sequence" representing the pronunciation information corresponding to the word. This dictionary may be referred to for extracting the way of pronunciation (reading) of the word or the notation of the word corresponding to the uttered speech.

Specifically, the dialog management unit 110 generates the response to the input speech from the user's way of pronunciation, as input at the microphone 23, and from the dialog hysteresis. Based on the various dialog rules, stored in a dialog rule table 111, the dialog management unit 110 generates a response pattern to the input speech.

The speech recognition unit 120 transforms the user's dialog to a form that can be processed by the dialog management unit 110, such as a text, syntax analysis or a frame for dialog. Specifically, the speech recognition unit 120 is made up by a dictionary for speech recognition 121, an acoustic model 122, a language model 123, an acoustic analysis unit 124 etc. In the acoustic analysis unit 124, features necessary for recognition are extracted every extremely short time period. For example, the energy of the acquired speech signals, number of zero crossings, pitch, frequency response and variations thereof are extracted. For frequency analysis, linear predictive analysis (LPC), fast Fourier transform (FFT) and a bandpass filter (BPF) are used.

Using the acoustic model 122 and the language model 123, the speech recognition unit 120 determines a word sequence corresponding to a feature sequence generated in the acoustic analysis unit 124. As a technique for recognition, a hidden Markov model (HMM), for example, is used.

The HMM is a status transition model having a status transition probability and a probability density function. The likelihood is determined by accumulating the values of probability, outputting the feature sequence, under status transition. The likelihood value, as a score, is used for matching between the way of pronunciation of the word stored in the dictionary for speech recognition and the way of pronunciation conferred to the letters or characters recognized by the image processing letter/character recognizing unit which will be explained subsequently. The transition probability and the probability density function are previously learned and readied through a learning process which is based on data for learning.

The acoustic model may be readied for each unit, such as phoneme (PLU), syllable, phrase or sentence. For example, if an acoustic model having kana (Japanese syllabary) "あ (uttered as a)", "い (uttered as i)", "う (uttered as u)", "え (uttered as e)", "お (uttered as o)", "か (uttered as ka)", "き (uttered as ki)", . . . , "ん (uttered as n)" as units, these can be combined in suitable combinations and interconnected to form such expressions as "はい (yes, uttered as hai)", "いいえ (no, uttered as iie)", "おはよう (good morning, uttered as ohayou)" or "いまなんじですか (what time ?, uttered as ima nanji desuka ?)". The phoneme is the acoustic and syllabic unit denoting the word pronunciation information. In the present specification, the phoneme and the PLU (phoneme-like unit) are used without making distinction therebetween. The uttered speech can necessarily be expressed as the combination of phonemes or PLUs (PLU sequence).

With the HMM, the similarity between the speech formed as described above and the feature sequence of the speech as acquired at the microphone 23 may be calculated as the score. As the information for forming the "speech" from the acoustic model, the language model 123 and the dictionary for speech recognition 121 are used. The dictionary for speech recognition 121 is a dictionary indicating the way of connection of acoustic models for forming each word to be recognized (shown here are single kana letters "あ (uttered as a)", "い (uttered as i)", and so forth. The language model 123 denotes the rule of connection between the words.

In the instance, shown below, a "word" denotes a unit which may be conveniently handled in pronunciation as an assembly in view of recognition processing, and is not necessarily coincident with the linguistic word as language unit. For example, although "北品川 (place name, uttered as Kita-Shinagawa)" is sometimes handled as a single word, it may also be handled as two separate words of "北 (North, uttered as kita)" and "品川 (Place name, uttered as Shinagawa)". Moreover, it may also be handled as one word in uttering "北品川 駅(Kita-Shinagawa station, uttered as Kita-Shinagawa eki)" or uttering "北品川 駅はどこですか(Where is the Kita-Shinagawa station?, uttered as kita shinagawaekiwa doko desuka)".

In the present specification, "kana or Japanese syllabary for reading" is the hira-gana' or kata-kana' stating the way of reading a Chinese character or an English word, while the "way of pronunciation" expresses the actual pronunciation of the kana in romaji (way of expressing Japanese syllabary in Roman letters) or in a combination of romaji and symbols, and is linguistically equivalent to "phoneme symbols".

Take an example of a sentence "~時から,~時まで (from . . . o'clock to . . . o'clock, uttered as . . . jikara, . . . jimade)". In this case, the manner or interconnection of individual words is determined by referring to a word model 122 for such words as "0 (zero, uttered as ze-ro)", "1 (one, uttered as ichi)" . . . "24 (twenty-four, uttered as nijuu-yon)", and "時 (o'clock, uttered as ji)", "から (from, uttered as kara)" and "まで (to, uttered as made)".

Next, the manner or interconnection of individual words in making up a sentence is determined by referring to a word model 123 for such words as "(words representing numbers) ", "時", "から" "(words representing numbers)", "時", and "まで".

By applying the HMM, with the use of the dictionary for speech recognition 121 and the language model 123, the similarity between the sentence such as "1 時から2 時まで(from one o'clock to two o'clock, uttered as ichijikara-nijimade)" or "2時から 5時まで (from two o'clock to five o'clock, uttered as nijikara-gojimade)" and the input feature sequence may be calculated as the score. That one of the sentences which is made up by a word sequence having the maximum score is output as being the result of speech recognition.

There are occasions where score calculations in speech recognition processing be performed on comprehensive evaluation of the acoustic score given by the acoustic model 122 and the linguistic score given by the language model 123.

The linguistic score is given on the basis of transition probability or concatenation probability between n consecutive words. The transition probability is a value as found statistically from a large quantity of texts and is herein termed "ngram".

There are occasions where the language model describes the classes of words (obtained on classifying words depending on certain standards or attributes), in addition to directly describing words in grammar or in n-gram.

For example, if words indicating place names are collected and given a class name of <place names>, it is possible to state a sentence example" <地名>+は +どこ+です+か (Where is the <place name>?, uttered as <chimei>+wa+doko+desu+ka)", or to provide the transition probability of"<地名>+は+どこ (uttered as <chimei>+wa+doko)". In this case, n=3 and the transition probability accurately is P("<地名>|は、どこ| (uttered as <chimei>|wa, doko|) ").

The output generating unit 130 transforms the response pattern, generated by the dialog management unit 110, into an actual operation. For example, if the dialog management unit 110 generates a response pattern "swing a neck to left and right+utter (No)", the output generating unit 130 is responsive thereto to generate an action pattern corresponding to "swinging a neck to left and right" to send it to the CPU 10, while generating a speech waveform corresponding to "No" to output it at the loudspeaker 24.

The image processing character recognizing unit 140 discriminates a letter/character string, contained in a image captured by the CCD camera 20, based on a letter/character pattern database 141. In the letter/character pattern database 141, there are stored image patterns of hira-gana, kata-kana, kanji (Chinese characters), alphabetical letters, symbols or letters of various languages as necessary. The image processing character recognizing unit 140 effects matching between the input image from the CCD camera 20 and image patterns stored in the letter/character pattern database 141 to recognize the letter/character string contained in the input image.

The pronunciation information generating unit 150 generates the pronunciation information corresponding to the letter/character sequence recognized by the image processing character recognizing unit 140, that is kana-reading of the letter/character sequence, while also generating the way of pronunciation (reading). For example, if the letter/character sequence "北品川" is recognized from the input image, the kana reading "きたしながわ (place name, uttered as kita-shinagawa)" is generated and the pronunciation information "kitashinagawa" is generated by the PLU sequence.

A word reading attribute table 151 is a table stating a set of words (letter/character sequence), kana reading and attributes, as shown in FIG. 4. The attributes denotes the meaning proper to a given word, such as "place name", "name" or "animal".

If the letter/character sequence recognized by the image processing character recognizing unit 140 is contained in this table, the kana reading may be extracted from this table to determine the way of pronunciation (reading) of the letter/character sequence from the kana reading. The word reading attribute table 151 is readied independently of the dictionary for speech recognition 121.

There is an upper limit to the number of words (vocabulary) in the dictionary for speech recognition, imposed by the speed of recognition, accuracy or processing constraint. However, words can be stated in the word reading attribute table 151 independently of these limitations. This word reading attribute table 151 may resort to diversion from other language resources, for example, dictionaries used in the kana-kanji conversion program or in the morpheme analysis program.

A letter/character reading table 152 is a table describing the correspondence between the letters or characters and the kana reading, as shown in FIG. 6. It states kana reading for each of symbols, alphabetical letters and Chinese characters. If the kana reading is stated for the totality of the usable letters or characters, the way of pronunciation (reading) can be conferred from the kana reading for an optional letter/character sequence.

A reading conferring table 153 states a set of rules for conferring kana reading in case the kana reading cannot be conferred if only the two tables are used, and another set of rules for specifying the kana reading that cannot be specified. There are, for example, sets of rules for unifying the on-reading (phonetic reading) and kun-reading (reading kanji characters in Japanese pronunciation), for long sounds, consecutive voiced sounds, repeated symbols and sets of rules for conferring the reading to the English words.

Specifically, the set of rules for long sound are those riles for transforming " . . . おう(uttered as . . . ou)" or " . . . えい(uttered as . . . ei)" to " . . . お–(uttered as . . . o-)" or " . . . え–(uttered as . . . e-)". By these rules, "とうきょう (capital of Japan, uttered as toukyou)" is transformed to "と–きょ–(uttered as to-kyo-)". The rules of consecutive voicing are such rules in which, when the reading of "品川口 (entrance of Shinagawa, uttered as shinagawa-guchi)" is generated from the combination of "しながわ (品川) (place name, uttered as shinagawa)" and "くち (口) (entrance, uttered as kuchi)", "くち (uttered as kuchi)" is voiced to "くち (uttered as guchi)". The rules for repetition of symbols are those rules used for conferring the kana reading to a repetition of symbols such as "々、ゝ、ヾ、ゞ、ヽ". The rules for conferring the kana reading to English words are those setting forth that, if a given English word ends in e", this e" is not read and, in its stead, the directly previous vowel is read as the vowel is read. For example, in conferring the reading kana "テ–ク (uttered as te-ku)" to "take", a reading kana "エ–– (uttered as e-)" is conferred to "a", while a reading kana "ク(uttered as ku)" is conferred to "ke".

Figure 7:
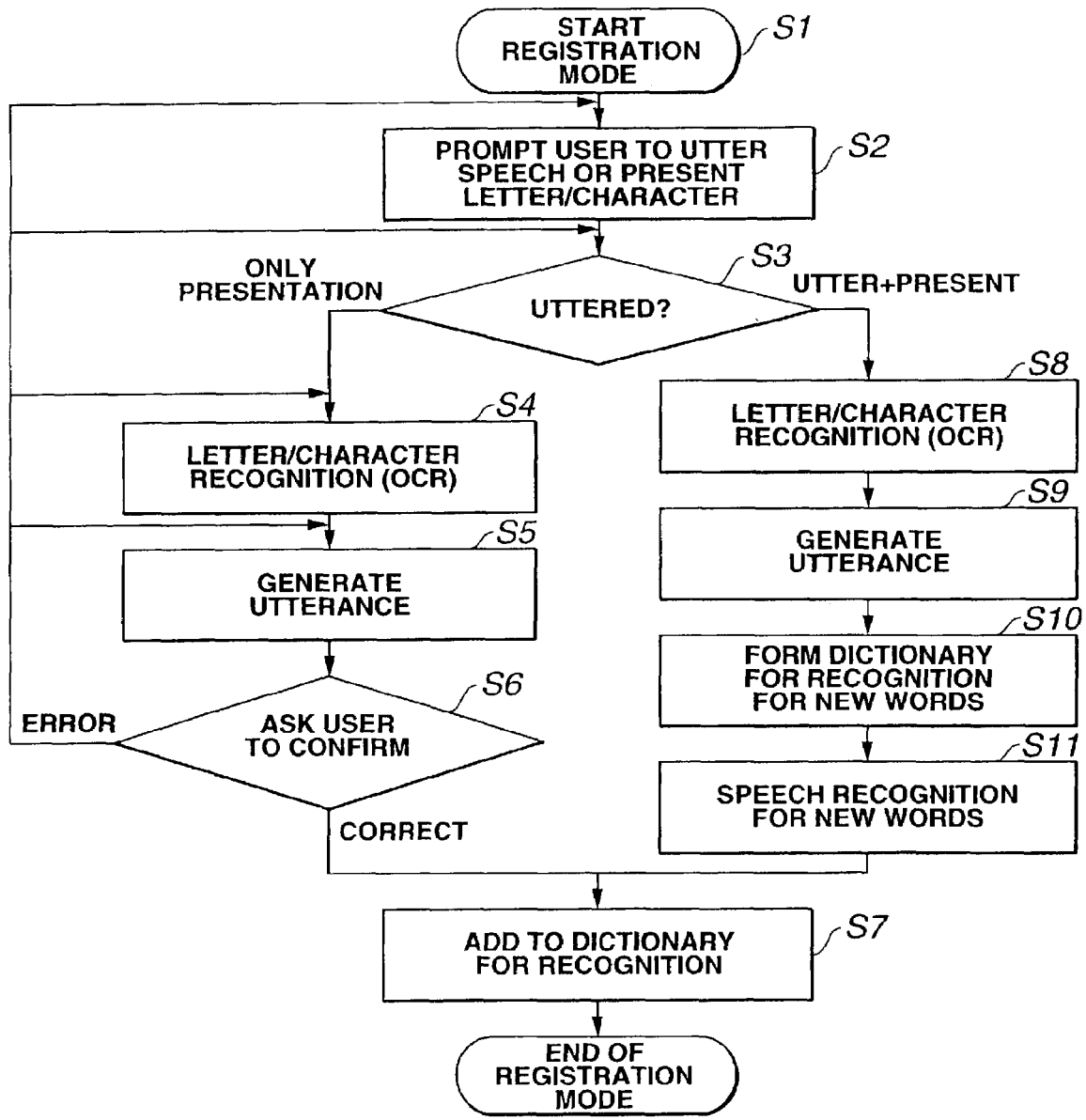
FIG. 7 is a flowchart for illustrating the processing for registering the new word in the dictionary for speech recognition by the robot apparatus as an illustrative structure of the present invention.

The processing in registering new words to the dictionary for recognition is specifically explained with reference to FIG. 7.

First, at step S1, transition is made to the a word registration mode for word registration. In making transition to the word registration mode, the robot apparatus 1, for example, transfers to the word registration mode with words uttered by the user, such as "登録モ–ド (registration mode, uttered as touroku moodo)" or "言葉を覚えて (learn a word, uttered as kotobawo oboete)" as a trigger. It is also possible to provide an operating button so that transition to the word registration mode occurs when this operating button is pressed.

At step S2, the robot apparatus 1 prompts the user to present the word desired to be registered before the CCD camera 20 of the robot apparatus 1 and/or to utter the reading of the word desired to be registered, in addition to the presentation.

The command to the user may be by speech uttered by the robot apparatus 1, or by demonstrating command contents on a display unit, not shown. Take an example of a sentence "北品川 (uttered as kitashinagawa)". The letters or characters presented by the user may be in kanji, kana, Roman letters for expressing the Japanese syllabary, or PLU sequences. Specifically, the robot apparatus 1 is able to recognize any of the notations: "北品川", "きたしながわ", "キタシナガワ" or "kitashinagawa".

At step S3, the robot apparatus 1 verifies whether only the letters or characters have been presented, or speech has been uttered in conjunction with letters or characters. If the letters or characters only are presented, the robot apparatus 1 proceeds to step S4 and, if speech has been uttered in conjunction with letters or characters, the robot apparatus 1 proceeds to step S8 as later explained. If otherwise, that is if only the speech has been uttered, recognition processing by a garbage model is executed as conventionally.

First, the case in which only letters or characters have been presented is explained. If only letters or characters have been presented, the robot apparatus 1 performs OCR (optical character recognition), based on the letter/character pattern database 141, in order to check what letter/character sequence is contained in the image photographed by the CCD camera 20. If the results of character recognition cannot be wine-pressed to one candidate, the image processing character recognizing unit 140 leaves plural candidates. For example, if the result of recognition "比品川 (river's name, uttered as hishogawa)" has been obtained for the character "北品川", this "比品川" is also left.

Then, at step S5, the speech pronunciation information generating unit 150 in the robot apparatus 1 generates the way of pronunciation (reading) for the letter/character sequence obtained as being the result of recognition at step S4. Details of generating the pronunciation will be explained subsequently. The pronunciation generating processing confers the way of pronunciation (reading) for the letter/character sequence. If there are plural recognized letter/character sequences and/or plural ways of pronunciation are possible for one letter/character sequence, the totality of the pronunciation patterns are applied.

At step S6, the robot apparatus 1 asks the user to check whether or not the way of pronunciation (reading) for the letter/character sequence generated as described above is correct, or which of the plural ways of pronunciation is to be adopted. If there is only one way of pronunciation (reading), the robot apparatus asks: Is the reading correct?". If the user has returned a reply "correct" or "yes", the robot apparatus 1 proceeds to step S7.

If there plural ways of pronunciation (reading), the robot apparatus asks: Is the reading correct?" for each of the different ways of reading. The robot apparatus 1 accepts the way of reading for which the user has returned a reply "correct" or "yes", and proceeds to step S7.

If a reply: "No" is received, that is if there is no correct reading, the robot apparatus 1 reverts to the processing of step S2 or step S4.

After determining the reading of the new word by the above processing, the robot apparatus 1 proceeds to step S7 to register the new word in the dictionary for recognition, as the letter/character sequence acquired and the way of pronunciation (reading) of the letter/character sequence for the letter/character sequence are correlated to each other. In adding a new word, the result of recognition of the presented letters or characters is used in the column of word symbols shown in FIG. 4. In a PLU sequence column, associated with the letter/character symbol, the way of pronunciation (reading), determined at step S6, is stated. After registering the new word, the registration mode is terminated. The processing of causing the updated dictionary for recognition to be reflected in the speech recognition, such as rebooting of the speech recognition program, then is carried out.

The case in which, at step S3, the user has presented letters or characters and simultaneously has uttered the letters or characters presented is explained. If pronunciation is made simultaneously with the presentation of letters or characters, the information obtained from both is used in a concerted fashion to generate the pronunciation information, such as PLU sequence, more accurately.

Specifically, plural letters or characters, estimated from the results of recognition of the letters or characters, plural kana readings estimated from these letters or characters and the way of pronunciation (reading) obtained in this manner are generated. By matching the plural ways of pronunciation (reading) obtained in this manner to the user's pronunciation acquired at the microphone 23, one kana reading and the way of pronunciation (reading) may be specified from the plural candidates generated as described above.

When the pronunciation is made simultaneously with presentation of letters or characters, the image processing character recognizing unit 140 in the robot apparatus 1 recognizes at step S8 the letters or characters from the image photographed by the CCD camera 20. It is noted that, if the image processing character recognizing unit 140 has been unable to winepress the results of the recognition of letters or characters to one candidate, it leaves plural candidates.

Next, at step S9, the speech pronunciation information generating unit 150 of the robot apparatus 1 generates the kana reading for the letter/character sequence obtained as the result of recognition at step S8. The way of pronunciation (reading) is conferred to the letter/character sequence by the speech generating processing. If there are plural recognized letter/character sequences, and/or plural readings are possible for a single letter/character sequence, all of the pronunciation patterns are applied.

Then, at step S10, a provisional dictionary for recognition is transiently generated from the letter/character sequence and the way of pronunciation (reading). This dictionary is referred to below as a dictionary for recognition of new words. For example, assume that the characters "北品川" as imaged by the CCD camera 20 is recognized by the image processing character recognizing unit 140 in two ways, namely "北品川" and "比晶川". The speech pronunciation information generating unit 150 confers the kana reading to the "北品川" and "比晶川". For "北品川", "きたしながわ (uttered as kita shinagawa)" is conferred, whereas, for "比晶川", the speech pronunciation information generating unit confers two kana readings, namely "ひしょうがわ (uttered as hishogawa)" and "くらあきらがわ(uttered as kuraakiragawa)", while generating the ways of pronunciation or readings thereof, that is PLU sequences. FIG. 8 shows the dictionary for recognition of new words in this case.

At step S11, speech recognition is performed on the pronunciation from the user, with the aid of the dictionary for recognition of new words. The speech recognition here is not the continuous speech recognition but word speech recognition. If the user has uttered before generating the dictionary for recognition of new words, the speech is recorded and speech recognition is carried out for the recorded speech. The speech recognition at step S11 is to find out such one of the registered words in the dictionary for recognition of new words which is acoustically closest to the user's pronunciation. It is noted however that, in the processing at step S11, such words which are the same in the word symbol but having different PLU sequences are deemed to be different words.

In FIG. 8, the one of the three registered words which is closest to the "きたしながわ" uttered by the user is to be found out. It is noted that two "比晶川" are different words. As a result, one set of the word symbol and the PLU sequence is specified.

When the set of the word symbol and the PLU sequence has been specified, this set is registered at step S7 in the regular dictionary for speech recognition 121. After registering the new word, the registration mode is terminated. The processing of causing the updated dictionary for recognition to be reflected in the speech recognition, such as rebooting of the speech recognition program, then is carried out.

By the above processing, the robot apparatus 1 is able to register the words, not stored in the regular dictionary for speech recognition 121, as a new word.

Figure 9:
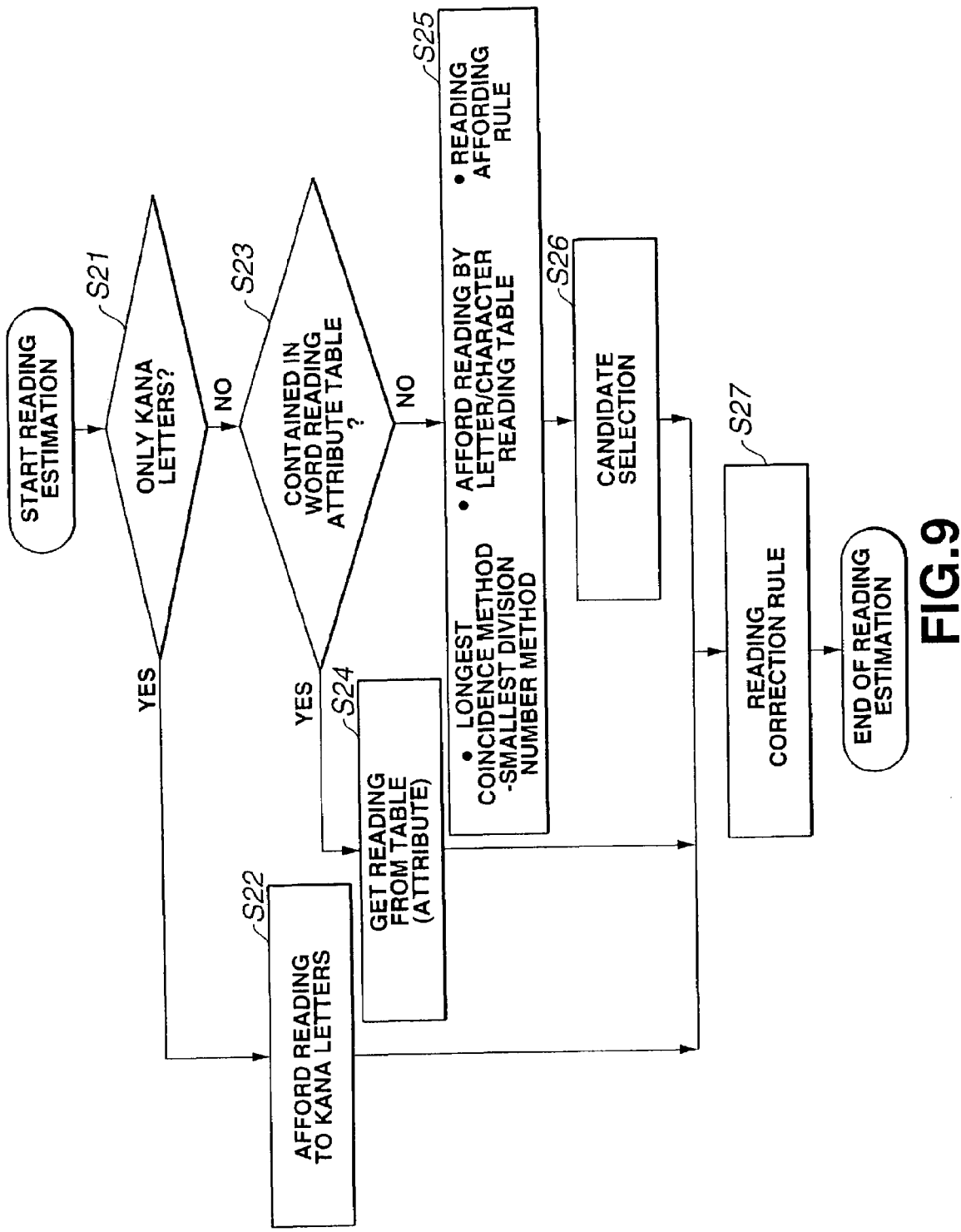
FIG. 9 is a flowchart for illustrating the processing for generating the manner of articulating (reading) a string of letters or letter/characters recognized by the robot apparatus as an illustrative structure of the present invention.

The generation of the way of pronunciation (reading) of the letter/character sequence at the above steps S5 and S9 is explained in detail with reference to FIG. 9.

First, at step S21, it is checked whether or not the letter/character sequence recognized by the image processing character recognizing unit 140 is formed only by kana letters. Meanwhile, the kana letters here also include long sound symbol "ー", repetition symbol "ヽ . . . ", in addition to the hira-gana and kata-kana letters. If the letter/character sequence is made up only by the kana letters, the recognized kana letter is set at step S22 as being the reading of the letter/character sequence. The pronunciation may at this time be corrected slightly, such as in connection with sound elongation.

On the other hand, at step S21, if the letter/character sequence recognized by the image processing character recognizing unit 140 contains letters or characters other than the kana letters, it is checked at step S23 whether or not the letter/character sequence is contained in the word reading attribute table 151.

If the letter/character sequence is contained in the word reading attribute table 151, the kana reading is acquired from the table and further the way of pronunciation (reading) is generated (step S24). If the word attribute is stated in the word reading attribute table 151, the attribute is acquired simultaneously. The manner of exploiting this attribute will be explained subsequently.

If the letter/character sequence is not contained in the word reading attribute table 151, the kana reading is acquired at step S25 by combining the conferring of the reading based on the longest match principle, articulation basic block method, the letter/character reading table 152 with the conferring of the reading based on the reading conferring rule.

The longest match principle and the articulation basic block method consist in testing whether or not the letter/character sequence which is the same as the input letter/character sequence cannot be formed by combining plural words contained in the word reading attribute table 151. For example, if the input letter/character sequence is "北品川駅前 (the front side of the Kita-Shinagawa station, uttered as kitashinagawa eki mae)", "北品川駅前" can be formed based on the combination of "北品川" and "駅前 (the front side of the station, uttered as eki mae)" in case "北品川駅前" is not contained in the word reading attribute table 151 but the "北品川" and "駅前" are contained therein, so that, as a result, the reading "きたしながわえきまえ (the front side of the Kita-Shinagawa station, uttered as kitashinagawa eki mae)" is acquired. If there are plural forming methods, such a reading comprised of a longer word (longest match principle) or such a reading that can be formed by a smaller number or words (articulation basic block method) is selected.

The conferring of the reading based on the letter/character reading table 152 is such a method in which a letter/character sequence is divided in terms of a letter or character as a unit and in which a reading is acquired from the letter/character reading table 152 in terms of a letter or character as a unit. In the case of a kanji, plural kana reading may be conferred to one kanji, so that the kana reading of the entire letter/character sequence is the combination of the kana readings of the respective kanji characters. Thus, the conferring of the reading based on the letter/character reading table is the method of reducing the number of combination by applying a rule that "the on-reading and the kun-reading may co-exist only on extremely rare cases".

Then, at step S26, the score or the degree of reliability is calculated for the respective candidates for the kana reading, acquired by the above methods, and the score or the degree of reliability which is higher in the rank is selected. This confers the kana reading to the input letter/character sequence. The way of pronunciation (reading) is generated from the resulting kana reading.

After the steps S22, S24 and S26, the way of pronunciation (reading) for the kana reading is corrected in accordance with the rules for sound elongation or consecutive sound voicing.

The word reading attribute table 151 is now explained in detail. The fact that a word has been newly registered in the dictionary for speech recognition 121 is not sufficient if the connection rule for the words recorded in the language model 123 is to be applied. For example, if "北品川" is additionally registered in the dictionary for speech recognition 121, this fact is not sufficient to generate the grammar for "北品川" or the probability of concatenation of between "北品川" and other words. Consequently, an ideal method for having the connection rule of the language model reflected in the newly registered word is to add the grammar or to re-calculate the probability of concatenation from text data to re-construct the language model. Instead, the language model can be applied after new registration by a simpler method, which is now explained.

First, a class name <unknown word> is given a word not contained in the language model. In the language model, the concatenation probability of an <unknown word> and another word is stated. The newly registered word is deemed to be an <unknown word> and the concatenation probability of this newly registered word to the other word is calculated from the concatenation probability of the <unknown word> to other words.

A class means a classification of words in accordance with a certain criterium or attribute. For example, words may be classified according to the meaning and respective classes may be nominated <place name>, <surname> or <name of nation>. Alternatively, words may be classified according to part-of-speech and respective classes may be nominated <noun>, <verb> or <adjective>.

In the language model, the probability of concatenation between classes or between a class and a word is stated, instead of stating the probability of concatenation between words. In finding the probability of concatenation between words, it is first checked to which class belongs a given word. The probability of concatenation for the relevant class then is found to calculate the probability of concatenation between words.

As for the newly registered word, it may be estimated at the time of registration to which class belongs a word in question in order to apply a class model.

In accordance with the foregoing, a probability of concatenation of an identical value is afforded to a model for unknown words. On the contrary, a class model is of a different value depending on which class belongs the word in question. Thus, in general, the linguistic score for a new registered word in case the class model is used is more appropriate and may, as a result, be recognized appropriately.

Thus, in word registration with speech recognition, the class name, which has so far been difficult to input, may be input readily. That is, if the letter/character sequence (word) obtained on letter or character recognition is included in the word reading attribute table 151, the class name can be acquired from the attribute column of the table. Meanwhile, only one attribute is stated in the attribute column in FIG. 5. Alternatively, plural attributes, such as <place name >, <proper noun> or <station name>, may be stated. If, in this case, there is a class <place name>, the classification name coincident with the class name is adopted from <place name>, <proper noun> or <station name>. The classification name coincident with the class name is here the <place name>, and hence the <place name> is adopted.

In letter or character recognition, there are occasions where recognition accuracy may be improved if the information on the concatenation of letters or characters is also resorted to in the recognition than if recognition is made from one letter or character to the next. Thus, the letter or character recognition may be improved in accuracy by employing the "word symbol" column of the dictionary for speech recognition or the "word" column of the word reading attribute table 151 as the information concerning the concatenation of letters or characters.

Figure 10:
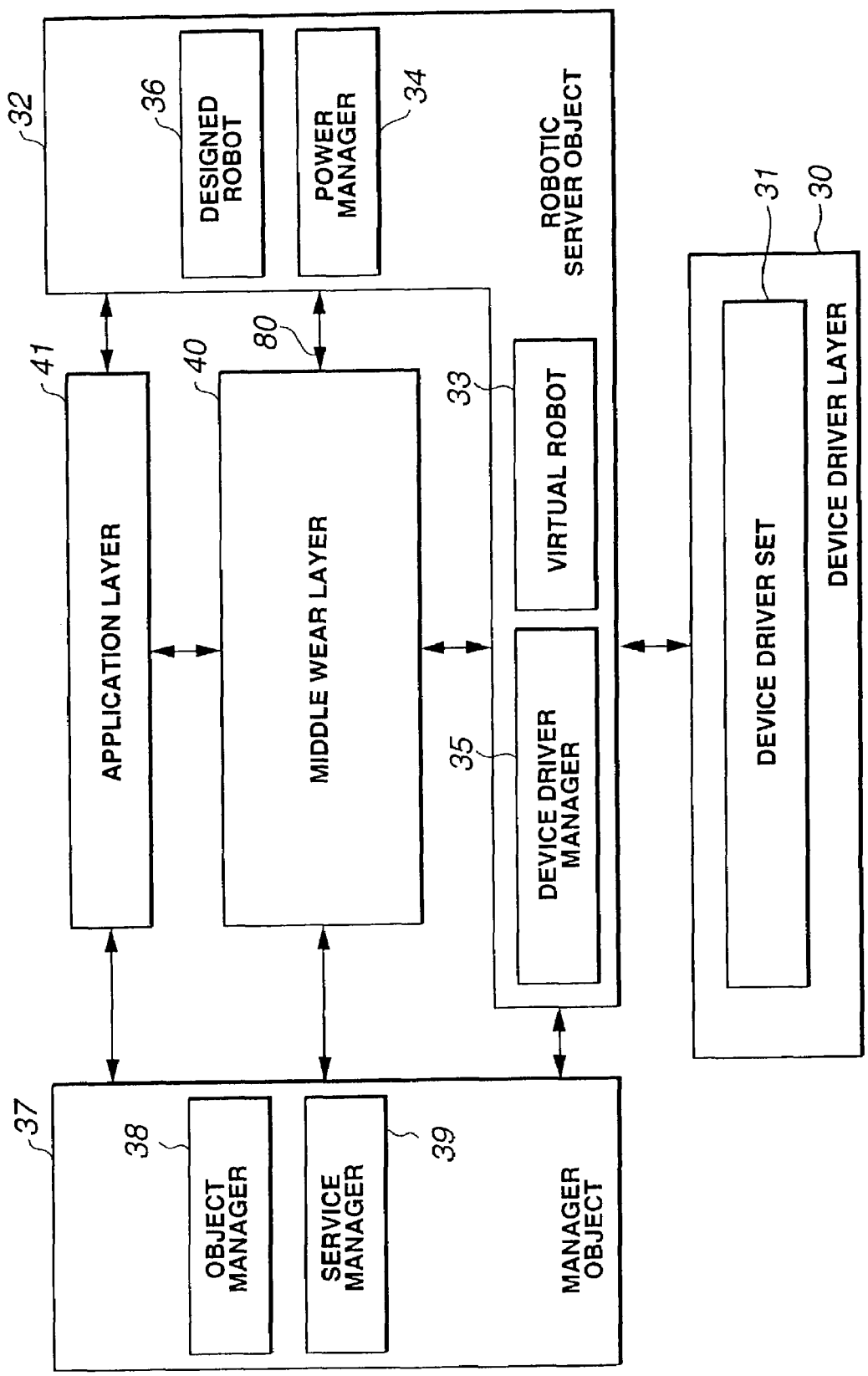
FIG. 10 is a block diagram showing the software structure of a control program of the robot apparatus as an illustrative structure of the present invention.

It should be noted that the robot apparatus 1 of the present embodiment is able to act autonomously based on an inner state of the robot apparatus. The software structure of the control program in the robot apparatus 1 is as shown in FIG. 10. This control program is pre-stored in the flash ROM 12 and is read out at an initial state on power up of the robot apparatus 1.

Referring to FIG. 10, a device driver layer 30 is disposed as a lowermost layer of the control program and is comprised of a device driver set 31 made up of plural device drivers. It is noted that each device driver is an object allowed to directly access the hardware used in a routine computer, such as CCD camera 20 (FIG. 2) or timer, and performs processing on receipt of interrupt from the associated hardware.

A robotic server object 32 is disposed as a lowermost layer of the device driver layer 30, and is comprised of a virtual robot 33, made up by a software set providing an interface for accessing the hardware, such as the aforementioned various sensors or the actuators $25_1$ to $25_n$, a power manager 34, made up by a software set supervising power on/off, a device driver manager 35, made up by a software set for supervising various other device drivers, and a designed robot 36, made up by a software set supervising the mechanism of the robot apparatus 1.

Figure 2:
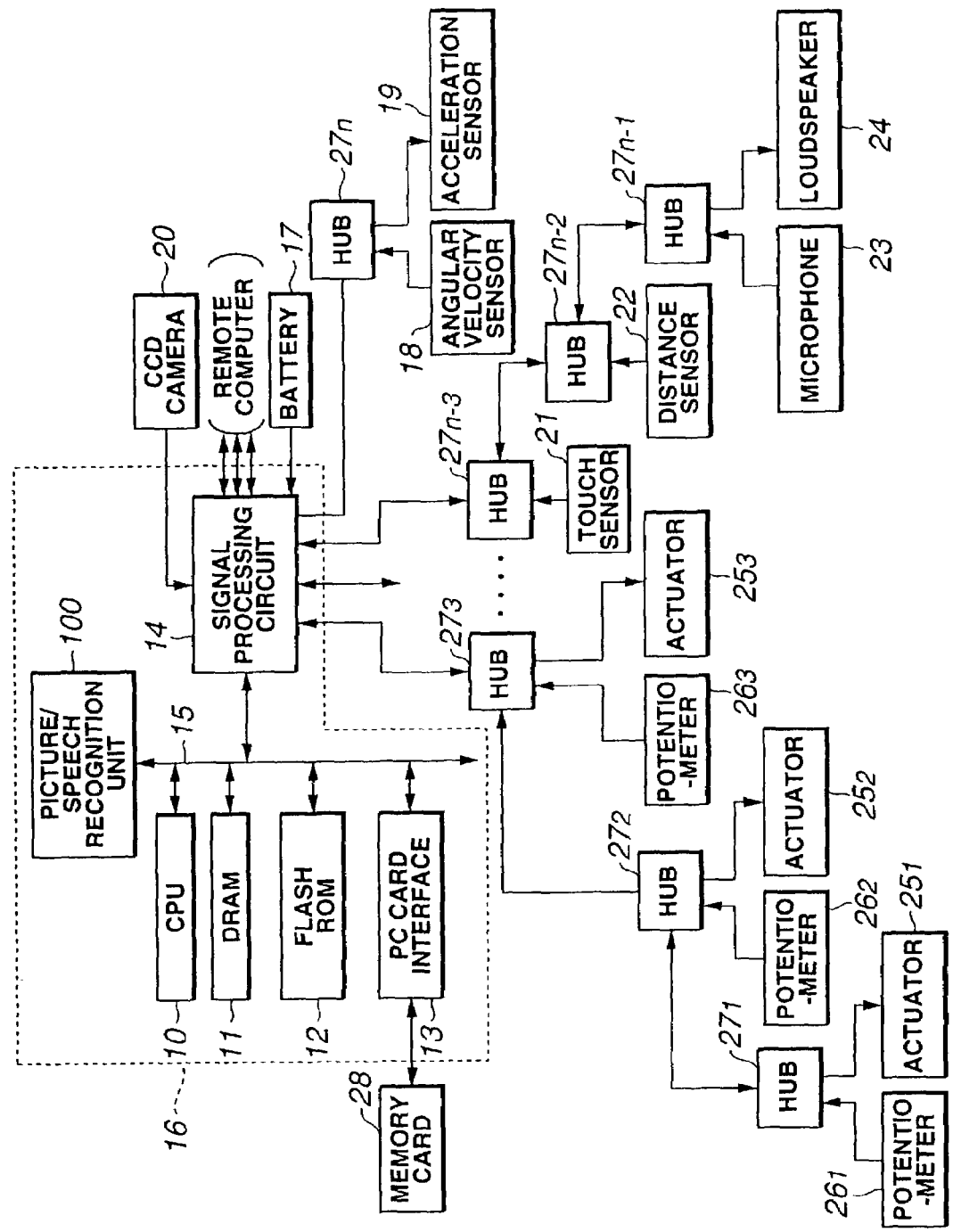
FIG. 2 is a block diagram showing the structure of the robot apparatus as an illustrative structure of the present invention.

A manager object 37 is made up by an object manager 38 and a service manager 39. The object manager 38 is made up by a software set supervising the booting or end of the software sets included in the robotic server object 32, a middleware layer 40 and an application layer 41. The service manager 39 is made up by a software set supervising the connection of the respective objects based on the information on the connection between objects stated in the connection file stored in the memory card 28 (FIG. 2).

The middleware layer 40 is located as an upper layer of the robotic server object 32 and is made up by a software set providing the basic functions of the robot apparatus 1, such as image processing or speech processing. The application layer 41 is located as an upper layer of the middleware layer 40, and is made up by a software set for determining the action of the robot apparatus 1 based on the results of processing by the software set forming the middleware layer 40.

Figure 11:
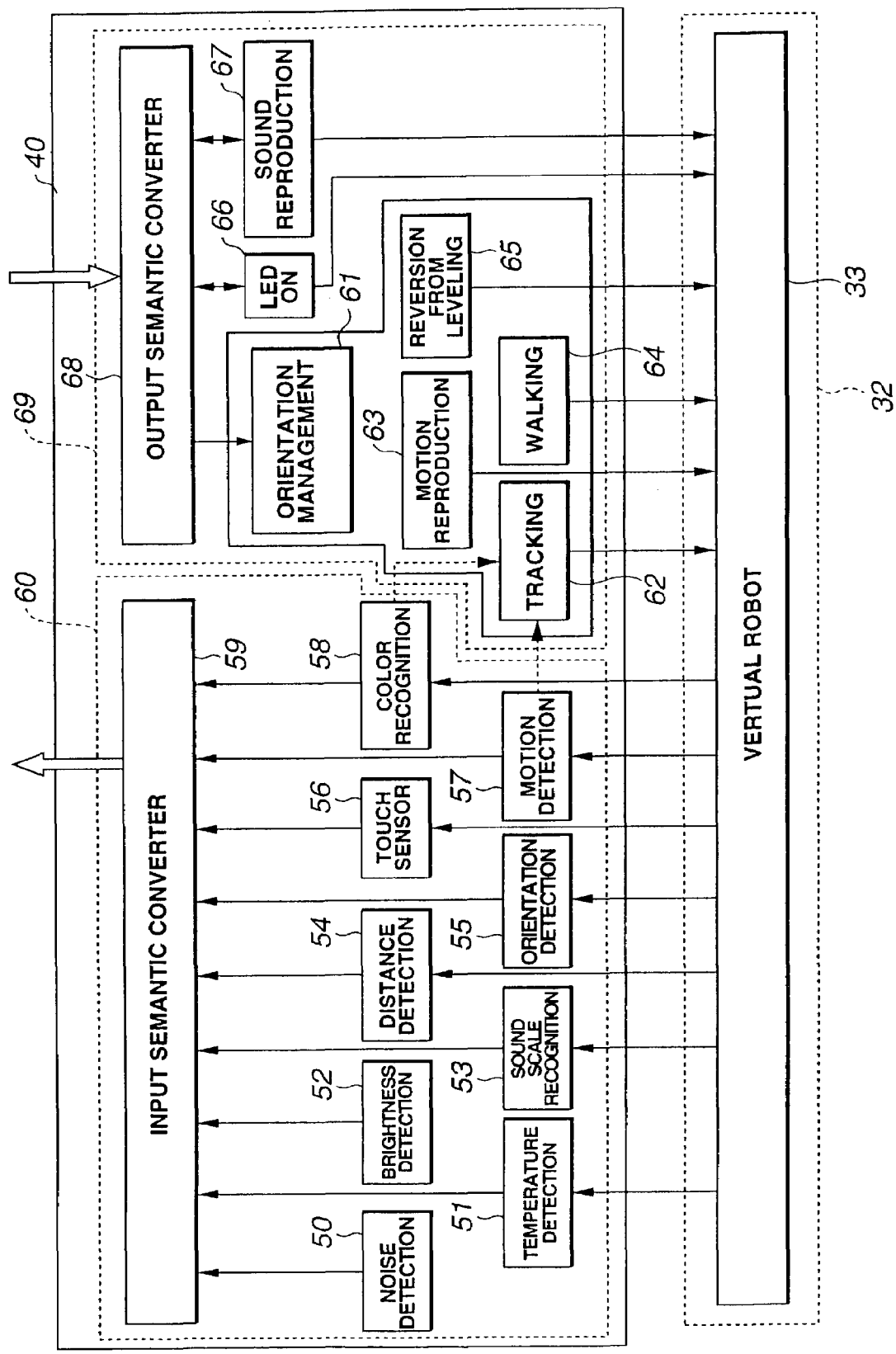
FIG. 11 is a block diagram showing the structure of the middle ware layer of the control program of the robot apparatus as an illustrative structure of the present invention.

FIG. 11 shows the specified software structure of the middleware layer 40 and the application layer 41.

Referring to FIG. 1, the middleware layer 40 is made up by a recognition system 60, having signal processing modules 50 to 58 for detection of noise, temperature, brightness, sound scale, distance or orientation, as a touch sensor, for motion detection and for color recognition, and an input semantics converter module 59, an output semantic converter module 68 and an output system 69, having signal processing modules 61 to 67 for orientation management, tracking, motion reproduction, walking, reversion from falldown, LED lighting and sound reproduction.

The signal processing modules 50 to 58 of the recognition system 60 captures data relevant data of the sensor data, image data and speech data, read out from the DRAM 11 (FIG. 2) by the virtual robot 33 of the robotic server object 32, performs preset processing thereon and sends the processed results to the input semantics converter module 59. For example, the virtual robot 33 is designed as a unit exchanging or transforming signals in accordance with a predetermined communication format.

Based on the processed results from the signal processing modules 50 to 58, the input semantics converter module 59 recognize the own status or the surrounding status, such as "noisy", "hot", "light", "ball detected", "falldown detected", "patted", "hit", "heard the sound scales of do, mi and so", "a moving object detected" or "obstacle detected", and commands or actions from the user, to output the result of recognition to the application layer 41.

Figure 12:
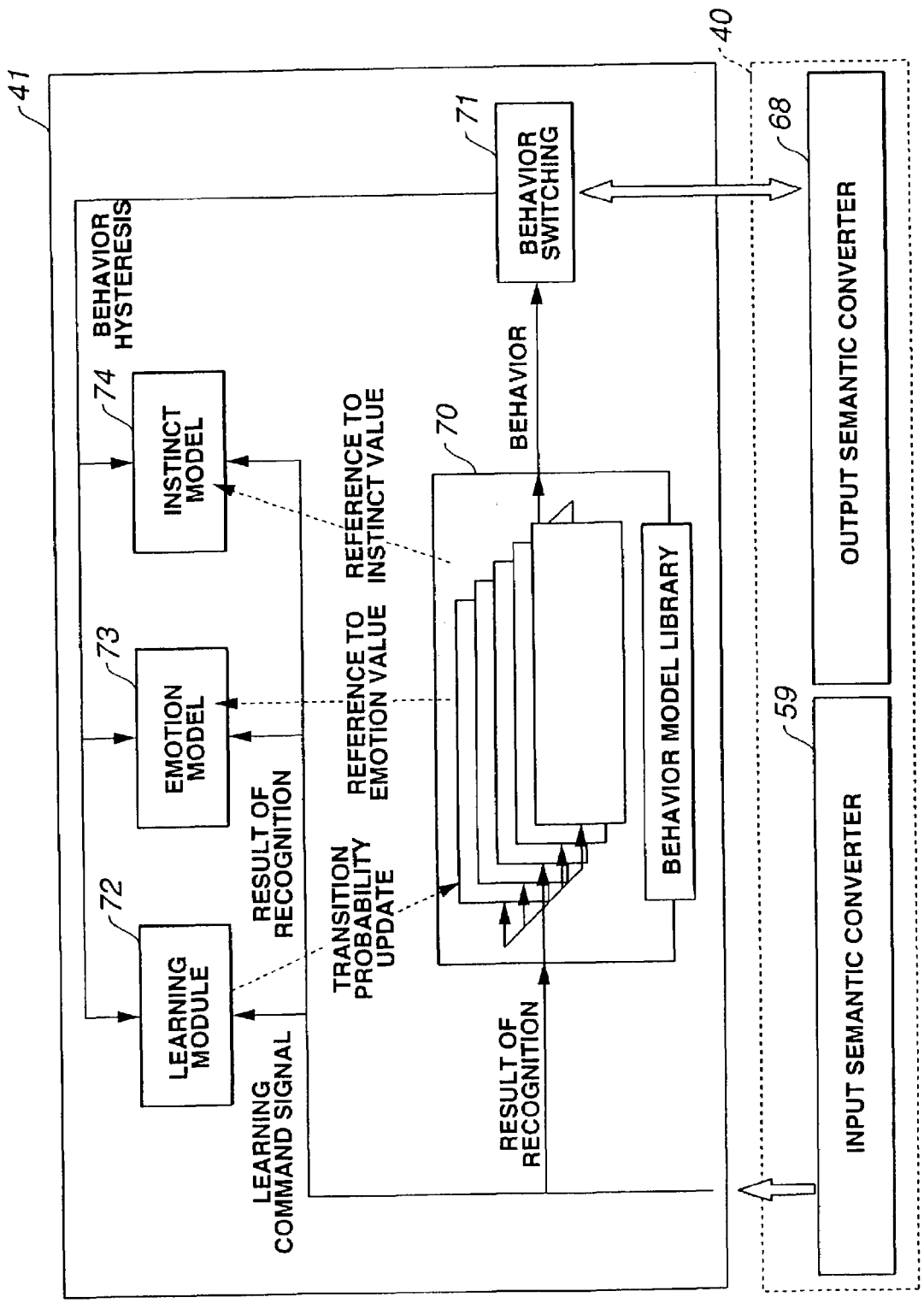
FIG. 12 is a block diagram showing the structure of the application layer of the control program of the robot apparatus as an illustrative structure of the present invention.

Referring to FIG. 12, the application layer 41 is made up by five models, namely a action model library 70, a action switching module 71, a learning module 72, an feeling model 73 and an instinct model 74.

Figure 13:
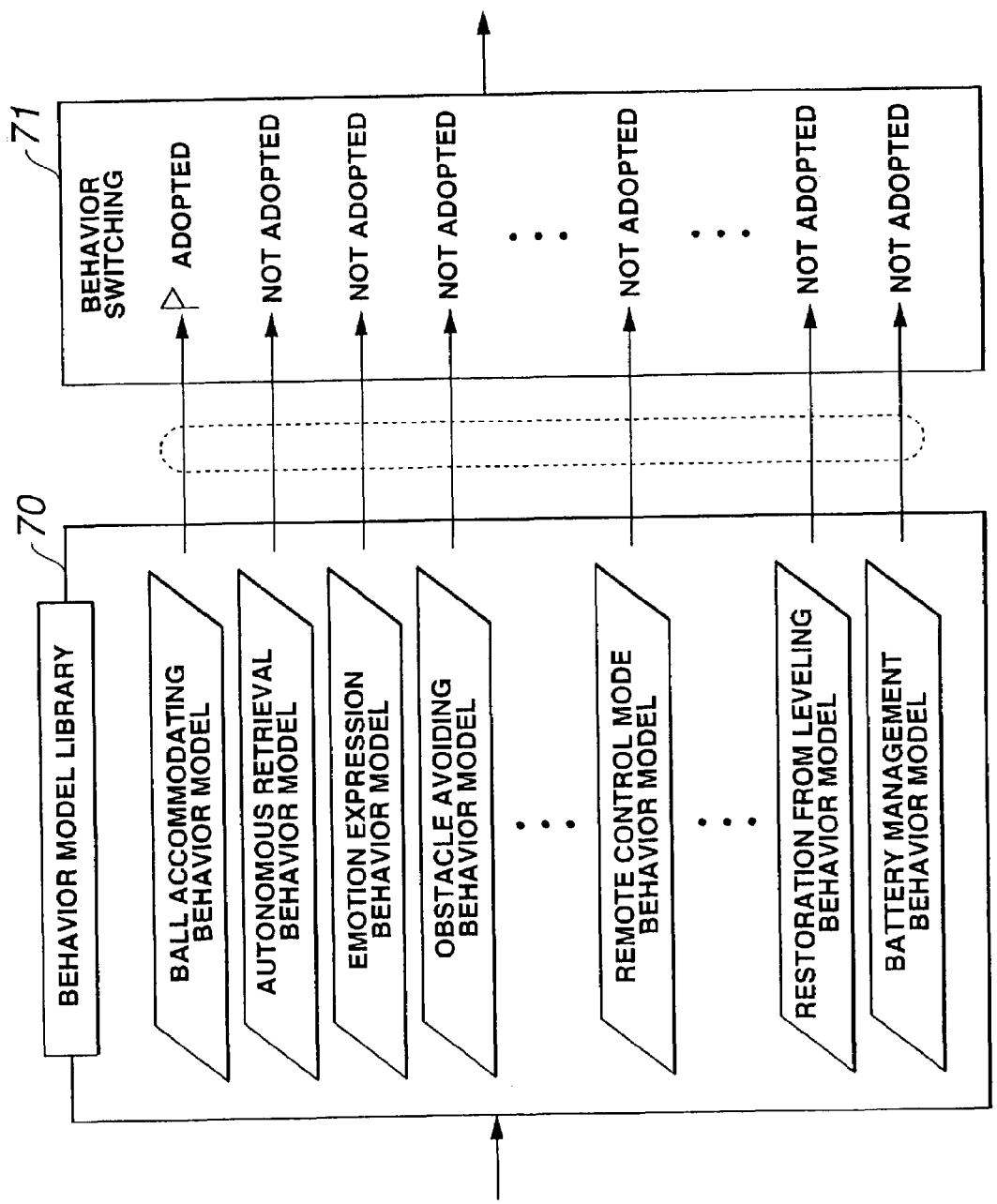
FIG. 13 is a block diagram showing the structure of a action model library of the control program of the robot apparatus as an illustrative structure of the present invention.

Referring to FIG. 13, the action model library 70 includes independent models, in association with several pre-selected condition items, such as "the residual battery capacity decreasing", "reversion from falldown", "evasion of an obstacle", "expressing the feeling" and "ball detection".

When the results of recognition are sent from the input semantics converter module 59, or a preset time has elapsed as from the time of supply of the last results of recognition, the action models determine the next following actions, as reference is had to the parameter values of the associated emotional values, as held in the feeling model 73, or to the parameter values of the associated emotional values, as held in the instinct model 74. The action models then output the results of decision to the action switching module 71.

Figure 14:
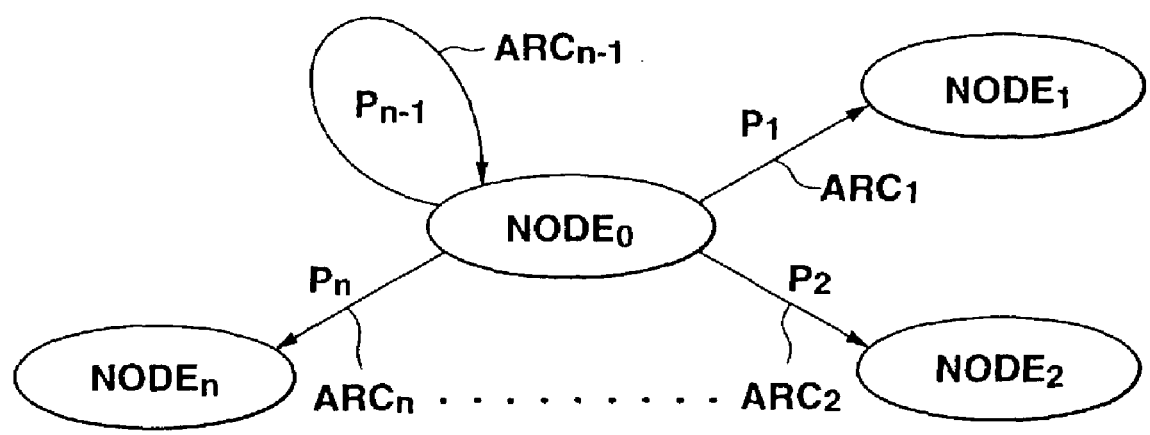
FIG. 14 schematically shows a finite probability automaton which is an algorithm for determining the action of the robot apparatus as an illustrative structure of the present invention.

Meanwhile, in the present embodiment, the respective action models use an algorithm, called the finite probability automaton, as a technique for determining the next action. The finite probability automaton is adapted for stochastically determining to which of nodes $NODE_0$ to $NODE_n$, shown in FIG. 14, transition is to be made from one of the nodes $NODE_0$ to $NODE_n$, based on the transition probability $P_1$ to $P_n$ set for arcs $ARC_1$ to $ARC_{n-1}$ interconnecting the $NODE_0$ to $NODE_n$.

Specifically, each action model includes a status transition table 80, shown in FIG. 15, for each of the $NODE_0$ to $NODE_n$, each forming its own action model, in association with the $NODE_0$ to $NODE_n$.

In this status transition table 80, input events (results of recognition), as the transition conditions for the nodes $NODE_0$ to $NODE_n$, are listed in the columns of "input event names", in the order of the priority, and further conditions for the transition conditions are stated in the associated items of the "data name" and the "data range".

Thus, in the $NODE_{100}$, shown in the status transition table 80 of FIG. 15, if the result of recognition "ball detected (BALL)" or the result of recognition "obstacle detected (OBSTACLE)" is given, data given along with the results of recognition, such as the "ball size (SIZE) being in a range of "0 to 1000" or "distance from the obstacle being in a range of 0 to 100" represents the condition for transition to other nodes, respectively.

In addition, with the present node $NODE_{100}$, transition to other nodes may be made when there is no input of the result of recognition but one of the parameters "joy", "surprise" and "sadness" held in the feeling model 73, among the parameters of respective emotions and desires, held in the feeling model 73 and in the instinct model 74, periodically referenced by the action model, is in a range from "50 to 100".

Moreover, in the status transition table 80, names of the nodes, to which transition may be made from the nodes $NODE_0$ to $NODE_n$, are listed in the row of the "nodes of destination of transition" of the item of the "probability of transition to other nodes". The probability of transition to the other nodes $NODE_0$ to $NODE_n$, to which transition may be made when all of the conditions stated in the columns of the "input event name", "data name" and "data range" have been met, is stated in corresponding locations in the item "probability of transition to other nodes", while the actions to be output in transition to the nodes $NODE_0$ to $NODE_n$ are stated in the row "output behavior" in the item "probability of transition to other nodes". Meanwhile, the sum of the probability values of the respective rows in the item "probability of transition to other nodes" is 100%.

Thus, in the $NODE_{100}$, expressed in the status transition table 80 of FIG. 15, if the result of recognition is given that the "ball has been detected (BALL)" and the size (SIZE) of the ball is in a "range from 0 to 1000", transition to the "$NODE_{120}$ (node 120)" may be made with the probability of "30%", with the action "ACTION1" being then output.

Each action model is formed by a succession of a number of the nodes $NODE_0$ to $NODE_n$, stated in the status transition table 80, so that, when the results of recognition have been given from the input semantics converter module 59, the next behavior is stochastically determined by exploiting the corresponding status transition table of the nodes $NODE_0$ to $NODE_n$, and the so determined results are output to the action switching module 71.

The action switching module 71, shown in FIG. 12, selects the action output from the action model, which ranks high in the preset priority order, and issues a command to execute the selected action to the output semantic converter module 68 of the middleware layer 40. This command is referred to below as an action command. In the present embodiment, the lower in FIG. 13 the location of a given action model, the higher is its rank in the priority sequence.

Moreover, the action switching module 71 notifies the learning module 72 feeling model 73 instinct model 74 of the end of an action, based on the action completion information as supplied from the output semantic converter module 68 after the completion of the action.

On the other hand, the learning module 72 is supplied with the results of recognition of the teaching received as an action from ths user, such as "hitting" or "patting" among the results of recognition supplied from the input semantics converter module 59.

Based on these results of recognition and the notification from the action switching module 71, the learning module 72 changes the corresponding transition probability of the corresponding action model in the action model library 70, in such a manner that the probability of occurrence of an action is lowered or raised depending on whether the robot is "hit (scolded)" or "patted (praised)", respectively.

On the other hand, the feeling model 73 holds parameters representing the parameters indicating the strength of the emotion, for each of six emotions of "joy", "sadness", "anger, "surprise", "disgust" and "fear". The feeling model 73 periodically updates the parameter values of these emotions based on the specified results of recognition such as "being hit" or "being patted" from the input semantics converter module 59, time elapsed and on the notification from the action switching module 71.

Specifically, the feeling model 73 calculates, from the variation ΔE[t] of the emotion as calculated based on the results of recognition supplied from the input semantics converter module 59, the action then taken by the robot apparatus 1, time elapsed since the previous updating and so forth, the current parameter value E[t] of the emotion and from a coefficient $k_e$ representing the sensitivity of the emotion, the parameter value E[t+1] for the next period, in accordance with the following equation (1):

$$E[t+1]=E[t]+k_e \times \Delta E[t] \quad (1)$$

and substitutes it for the current parameter value E[t] of the emotion to update the parameter value of the emotion. The feeling model 73 similarly updates the parameter values of all of the emotions.

Meanwhile, it is predetermined to which extent the respective results of recognition or the notification from the output semantic converter module 68 affects the variation ΔE[t] of the respective emotions, such that the results of recognition "being hit" or "being patted" significantly affect the variation of the parameter value ΔE[t] of the emotion "anger" or the variation of the parameter value ΔE [t] of the emotion "joy", respectively.

The notification from the output semantic converter module 68 is what may be called the feedback information of the action (information on action completion) and is the information on the results of action occurrence. The feeling model 73 also causes the feeling to be changed by this information. For example, the feeling level of anger is lowered by the action of "barking". Meanwhile, the notification of the output semantic converter module 68 is also input to the learning module 72, such that the learning module 72 changes the corresponding transition probability of the action model based on the notification.

Meanwhile, the feedback of the results of the action may be made by an output of the action switching module 71 (action added to with the feeling).

On the other hand, the instinct model 74 holds parameters, expressing the intensity of the desire, for each of the four reciprocally independent desires, namely the desire for "exercise", desire for "affection", "appetite" and "curiosity". The instinct model 74 periodically updates the parameter values of these desires based on the results of recognition given from the input semantics converter module 59, time elapsed and on the notification from the action switching module 71.

Specifically, as for the desire for "exercise", desire for "affection" and "curiosity", the instinct model 74 calculates the parameter values I(k+1) of these desires at the next period, in such a manner that, with the variation of the desires ΔI[k], calculated by a preset calculating expression based on for example results of recognition, time elapsed and on the notification from the output semantic converter module 68, the current parameter values of the desires I[k] and with a coefficient expressing the sensitivity of the desire $k_i$, using the following equation (2):

$$I[k+1]=I[k]+k_i \times \Delta I[k] \quad (2)$$

and substitutes the result of calculations for the current parameter values of the desires I[k] to update the parameter values of the desires. In similar manner, the instinct model 74 updates the parameter values of the respective desires excluding the "appetite".

Meanwhile, it is predetermined to which extent the results of recognition and the notification from the output semantic converter module 68, for example, affect the variation ΔI[k] of the parameter values of the respective desires, such that, for example, the notification from the output semantic converter module 68 significantly affects the variation ΔI[k] of the parameter value "fatigue".

Meanwhile, the parameter values of the respective emotions and desires (instinct) are controlled to be varied in a range between 0 and 100, while the values of the respective coefficients ke and ki are individually set for the respective emotions and desires.

On the other hand, the output semantic converter module 68 of the middleware layer 40 gives abstract action commands, given from the action switching module 71 of the application layer 41 as described above, such as "advance", "rejoice", "cry" or "tracking (a ball)", to the signal processing modules 61 to 67 of the output system 69, as shown in FIG. 11.

When given the action command, the signal processing modules 61 to 67 generate servo command values to be sent to the associated actuators 251 to 25n (FIG. 2), for taking the action, speech data of the sound to be output from the loudspeaker 24 (FIG. 2) or driving data to be sent to the LEDs as eyes, and sequentially output these data to the associated actuators 251 to 25n, loudspeaker 24 or to the LEDs, sequentially through the virtual robot 33 of the robotic server object 32 and to the signal processing circuit 14 (FIG. 2).

In this manner, the robot apparatus 1 is able to take autonomous actions, based on the control program, responsive to its own state (inner state) and to the surrounding state (external state). Thus, the robot apparatus not having the program for executing the above-described letter or character recognition may be caused to execute the letter or character recognition processing shown in FIG. 7 by causing the robot apparatus to read in a control program for executing the processing of determining the way of pronunciation of the letters or characters extracted from an image by the letter or character recognition processing based on the speech recognized from the surrounding sound by the speech recognition processing.

Such control program is provided through a recording medium recorded in a form that can be read by the robot apparatus 1. The recording medium that records the control program may, for example, be a recording medium that may be magnetically read, such as magnetic tape, floppy (registered trademark) disc, or a magnetic card), or a recording medium that can be optically read, such as CD-ROM, MO, CD-R or DVD. The recording medium also includes a semiconductor memory or a so-called memory card of any optional shape, such as rectangular or square shape, or an IC card. The control program may also be provided over e.g., the Internet.

These control programs are reproduced by for example a dedicated read-in driver or a personal computer so as to be transmitted over a cable connection or a wireless path to the robot apparatus 1 so as to be read therein. If provided with a driver for a small-sized recording medium, such as IC card, the robot apparatus 1 is able to directly read out the control program from the recording medium. The robot apparatus 1 is also able to read-in the control program from the memory card 28.

It is to be noted that the present invention is not limited to the above-described embodiment and may be varied without departing from its scope. Although a four-robot apparatus walking on four legs has been described in the present embodiment, it may also walk on two legs. Moreover, movement means is not limited to the leg movement system.

Figure 16:
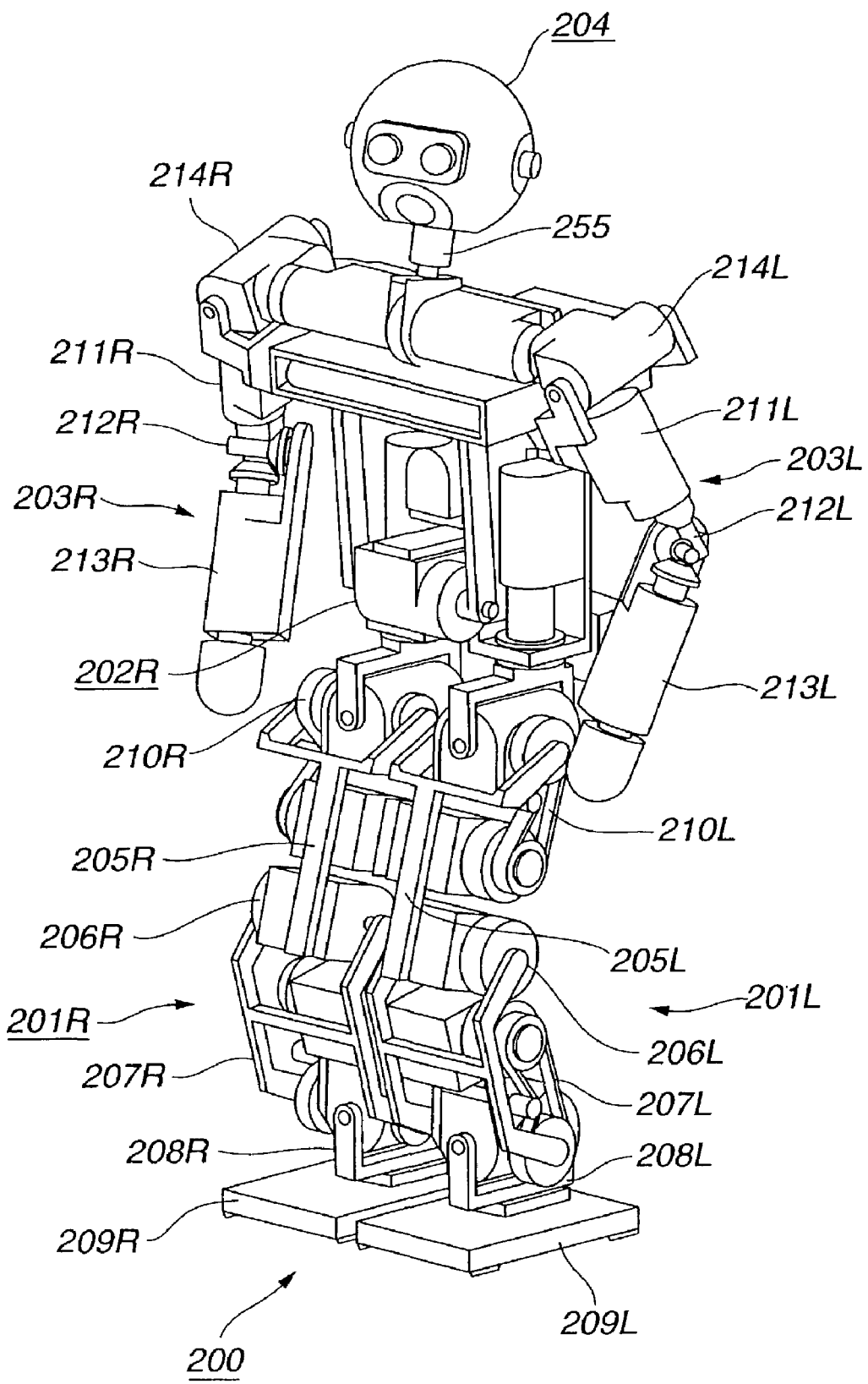
FIG. 16 is a perspective view for illustrating the appearance, as seen from the front side, of a humanoid type robot apparatus, shown as an illustrative structure of the present invention.
Figure 17:
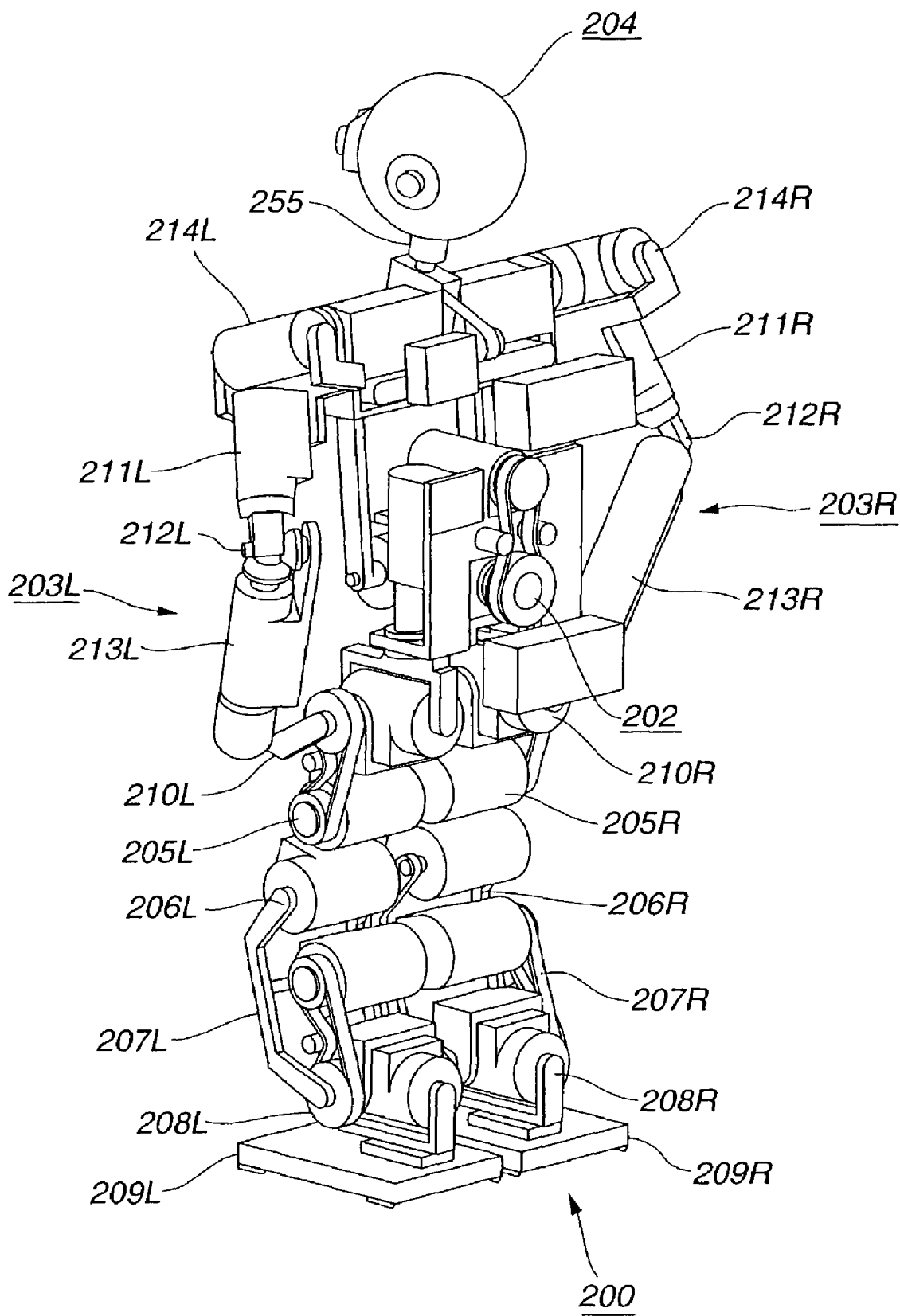
FIG. 17 is a perspective view for illustrating the appearance, as seen from the back side, of a humanoid type robot apparatus, shown as an illustrative structure of the present invention.
Figure 18:
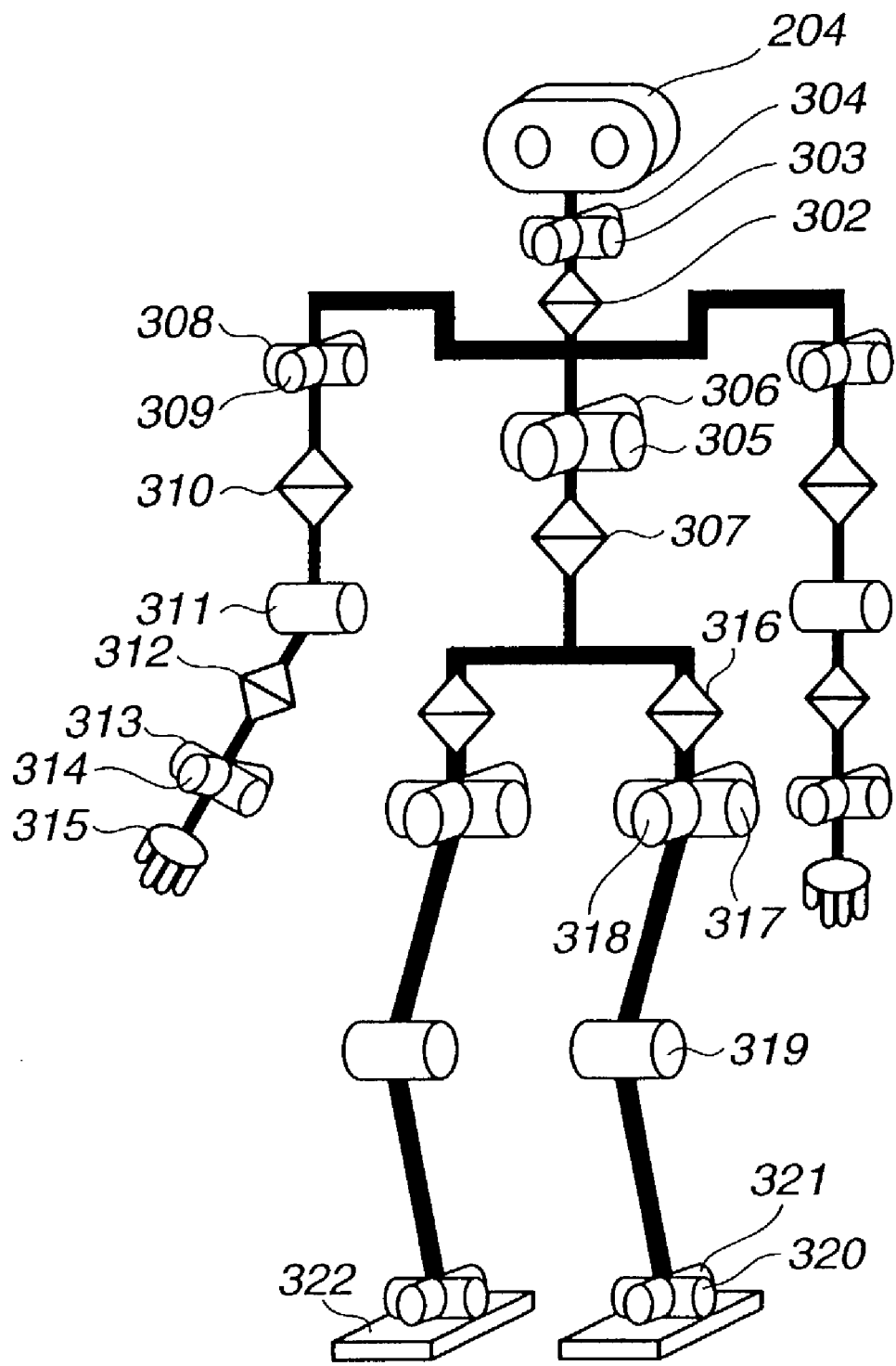
FIG. 18 schematically shows a freedom degree forming model of a humanoid type robot apparatus, shown as an illustrative structure of the present invention.

A modification of the present invention in the form of a humanoid robot apparatus is now explained in detail. FIGS. 16, 17 show a humanoid robot apparatus 200, as viewed from its front side and from its rear side, respectively. FIG. 18 also schematically shows the structure of the degrees of joint freedom proper to the humanoid robot apparatus 200.

Referring to FIG. 16, the humanoid robot apparatus 200 is made up by right and left lower limbs 201R, 201L, by which the robot walks, a body trunk 202, right and left upper limbs 203R, 203L, and a head unit 204.

The right and left lower limbs 201R, 201L are made up by thighs 205R, 205L, knee joints 206R, 206L, shanks 207R, 207L, foot ankles 208R, 208L and foot flats 208R, 208L, and are connected to substantially the lowermost end of the body trunk 202 by hip joints 201R, 201L. The right and left upper limbs 203R, 203L are made up by upper arms 211R, 211L, elbow joints 212R, 212L and forearms 213R, 213L, and are connected to right and left shoulder joints 214R, 214L to right and left upper side edges of the body trunk 202, respectively. The head unit 204 is connected to a neck joint 255 to approximately the center of the uppermost end of the body trunk 202.

The head unit 204 has three degrees of freedom, namely a yaw axis 302, a pitch axis 303 and a roll axis 304 of the neck joint supporting the head unit.

An arm joint is made up by a shoulder joint pitch axis 308, a shoulder joint pitch axis 308, a shoulder joint roll axis 309, an upper arm yaw axis 310, an elbow joint pitch axis 311, a forearm yaw axis 312, a wrist joint pitch axis 313, a wrist joint roll axis 314 and a hand unit 315. The hand unit 315 is actually a multi-joint multi-freedom structure comprised of plural fingers. However, the movement of the hand unit 315 contributes to or influences the orientation control or walking control for the humanoid robot apparatus 200, only to a lesser extent, so that the hand unit is assumed herein to be of zero degree of freedom. Thus, the respective arm units each are of seven degrees of freedom.

The body trunk has three degrees of freedom, namely a body trunk pitch axis 305, a body trunk roll axis 306 and a body trunk yaw axis 307.

The respective legs, forming lower limbs, are made up by a hip joint yaw axis 316, a hip joint pitch axis 317, a hip joint roll axis 318, a knee joint pitch axis 319, a wrinkle joint pitch axis 320, a wrinkle joint roll axis 321 and a foot unit 322. In the present specification, a point of intersection of the hip joint pitch axis 317 and the hip axis roll axis 318 defines the hip joint position of the humanoid robot apparatus 200. The foot of the human being corresponding to the foot unit 322 is actually a multi-joint multi-freedom-degree structure, however, the foot of the humanoid robot apparatus 200 is of the zero degree of freedom. Thus, each foot unit is comprised of six degrees of freedom.

To summarize, the humanoid robot apparatus 200 in its entirety has a sum total of 3+7×2+3+6×2=32 degrees of freedom. It should be noted that the number of the degrees of freedom of the entertainment oriented humanoid robot apparatus 200 is not necessarily limited to 32, such that the number of the degrees of freedom, that is the number of joints, may be suitably increased or decreased depending on the constraint conditions for designing or preparation or on particular design parameters required.

In actuality, the above-described respective degrees of freedom, owned by the humanoid robot apparatus 200, are implemented by actuators. In the light of the demand for excluding excessive swelling in appearance and for orientation control of an unstable structure walking on two legs, the actuators are desirably small-sized and lightweight.

Figure 19:
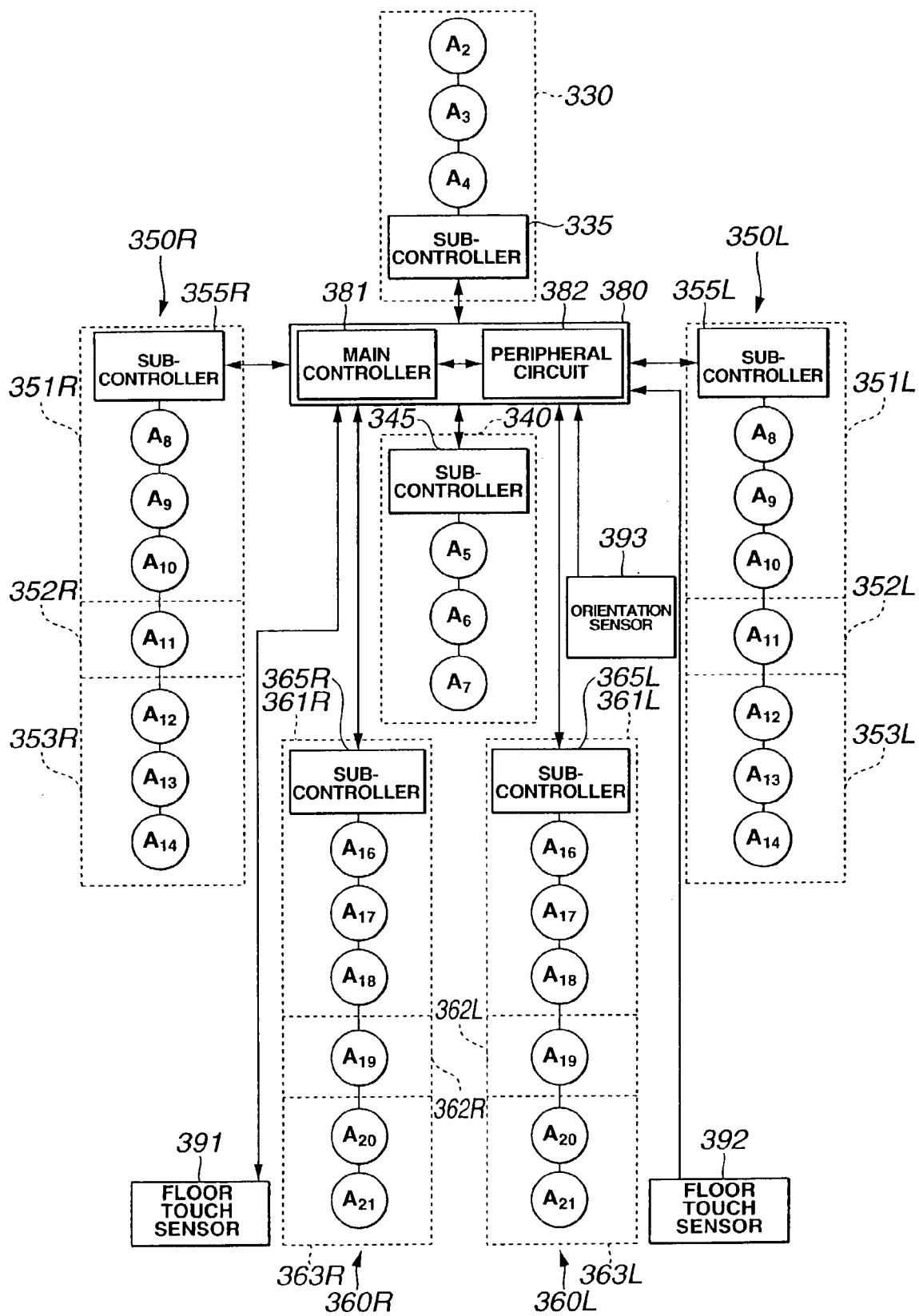
FIG. 19 illustrates a control system structure of a humanoid type robot apparatus, shown as an illustrative structure of the present invention.
Figure 20B:
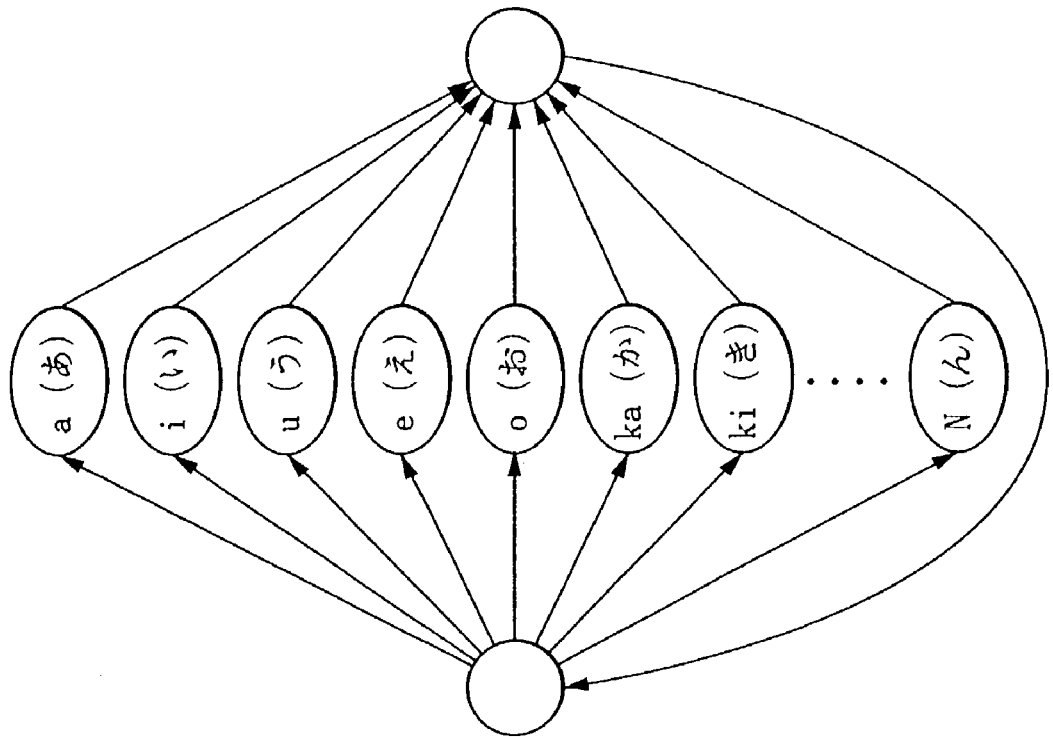
FIG. 20B schematically shows a conventional method for speech recognition which applies a garbage model having the "kana" as a basic unit.
Figure 20A:
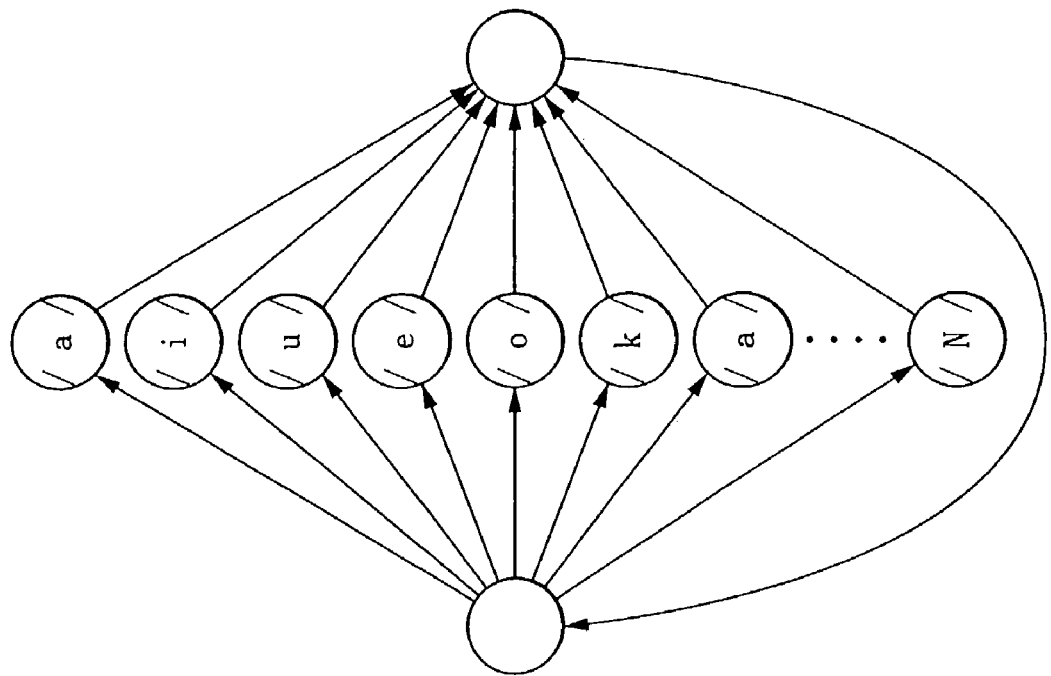
FIG. 20A schematically shows a conventional method for speech recognition which applies a garbage model having the "phoneme" as a basic unit.

FIG. 19 schematically shows a control system structure of the humanoid robot apparatus 200. As shown therein, the humanoid robot apparatus 200 is made up by structural units 330, 340, 350R/L, 360R/L, representing the four limbs of the human being, and a control unit 380 for performing adaptive control for realizing concerted movements between the respective structural units. It is noted that R and L denote suffixes representing right and left, respectively.

The movement of the humanoid robot apparatus 200 in its entirety is comprehensively controlled by a control unit 380, which control unit 380 is made up by a main controller 381, not shown, made up in turn by main circuit components, such as CPU (central processing unit) or memories, and a peripheral circuit 382, including a power supply circuit, not shown, and an interface, also not shown, for command exchange. There is no particular limitation to the mounting site of the control unit 380. Although the control unit 380 is mounted on the body trunk unit in the illustrated embodiment, it may also be mounted on the head unit 330. Alternatively, the control unit 380 may be arranged outside the humanoid robot apparatus 200 for communication with the main portion of the humanoid robot apparatus 200 over a cable or by a wireless route.

The degree of freedom in the respective joints in the humanoid robot apparatus 200, shown in FIG. 19, is implemented by associated actuators. That is, the head unit 330 is provided with a neck joint yaw axis actuator $A_2$, a neck joint pitch axis actuator $A_3$ and a neck joint roll axis actuator $A_4$, expressing the neck joint yaw axis 302, a neck joint pitch axis 303 and a neck joint roll axis 304, respectively.

The head unit 330 is also provided with a CCD (charge coupled device) camera for imaging the outside state, a distance sensor for measuring the distance to an object lying ahead, a microphone for collecting the external sound, a loudspeaker for outputting the speech, a touch sensor for detecting the pressure due to physical actions, such as patting or hitting from the user.

The body trunk unit 340 is provided with a a body trunk yaw axis actuator $A_5$, a body trunk pitch axis actuator $A_6$ and a body trunk roll axis actuator $A_7$, expressing a body trunk yaw axis 305, a body trunk pitch axis 306 and a body trunk roll axis 307, respectively. In addition, the body trunk unit 340 is provided with a battery operating as a power supply for starting the operation of the humanoid robot apparatus 200. This battery is formed by a rechargeable cell.

The arm unit 350R/L is subdivided into an upper arm unit 351R/L, an elbow joint unit 352R/L and a forearm unit 353R/L. Specifically, the arm unit 350R/L is provided with a shoulder joint pitch axis actuator $A_8$, a shoulder joint roll axis actuator $A_9$, an upper arm yaw axis actuator $A_{10}$, an elbow joint pitch axis actuator $A_{11}$, an elbow joint roll axis actuator $A_{12}$, a wrist joint pitch axis actuator $A_{13}$ and a wrist joint roll axis actuator $A_{14}$, expressing a shoulder joint pitch axis 308, a shoulder joint roll axis 309, an upper arm yaw axis 310, an elbow joint pitch axis 311, an elbow joint roll axis 312, a wrist joint pitch axis 313 and a wrist joint roll axis 314, respectively.

The leg unit 360R/L is subdivided into a thigh unit 361R/L, a knee unit 362R/L and a shank unit 363R/L. Specifically, the leg unit 360R/L is provided with a hip joint yaw axis actuator $A_{16}$, a hip joint pitch axis actuator $A_{17}$, a hip joint roll axis actuator $A_{18}$, a knee joint pitch axis actuator $A_{19}$, a wrinkle joint pitch axis actuator $A_{20}$ and a wrinkle roll joint axis actuator $A_{21}$, expressing a hip joint yaw axis 316, a hip joint pitch axis 317, a hip joint roll axis 318, a knee joint pitch axis 319, a wrinkle joint pitch axis 320 and a wrinkle roll joint axis 320, respectively. Each of the actuators $A_2$, $A_3$ . . . may be formed by a small-sized servo actuator of the type loaded in a motor unit directly connected to the gear and in which a servo control system is of one chip and loaded in the motor unit.

For the respective structural units, namely the head unit 330, body trunk unit 350 and the respective leg units 360, sub-controllers 335, 345, 355R/L and 365R/L of actuator driving controllers are provided, respectively. There are also provided touchdown sensors 391, 392 for detecting whether or not the foot soles of the leg units 360R, 360L have touched the floor, while there is provided in the body trunk unit 340 an orientation sensor 393 for measuring the orientation.

The touchdown sensors 391, 392 are formed by proximity sensors and/or by micro-switches provided on for example the foot soles. The orientation sensor 393 is formed by for example the combination of an acceleration sensor and a gyro sensor.

Based on an output from the touchdown sensors 391, 392, it may be determined whether the left and right legs are currently in the stance state or in the flight state during walking or running. Moreover, based on an output of the orientation sensor 393, the tilt or the orientation of the body trunk portion can be extracted.

The main controller 381 may be responsive to an output of the sensors 391 to 393 to dynamically correct the control target. More specifically, the main controller 381 is able to perform adaptive control of the sub-controllers 335, 345, 355R/L and 365R/L to realize a full body movement pattern of the humanoid robot apparatus 200 in which the upper limbs, body trunk and the lower limbs are driven in concerted fashion.

As for the full-body movement of the humanoid robot apparatus 200, commands for setting foot movement, ZMP (zero moment point) trajectory, body trunk movement, upper limb movement and the waist height and for instructing movements in keeping with the setting content are transferred to the respective sub-controllers 335, 345, 355R/L and 365R/L. The respective sub-controllers 335, 345, . . . interpret the commands received from the main controller 381 to output the driving control signal to the actuators $A_2$, $A_3$ . . . . The "ZMP" means a point on the floor surface where the moment due to the reaction from the floor during walking is zero., while the "ZMP trajectory" means a locus of movement along which the ZMP moves during the time period of walking of the humanoid robot apparatus 200.

During the walking, the gravitational force and the inertial force as well as moments thereof act from the walking system on the floor surface due to the gravitational force and the acceleration. The so-called "D'Alembert's principle" states that the aforementioned gravitational force and the inertial force as well as moments thereof are counterbalanced with the force of reaction from the floor in the form of the reaction from the floor surface to the walking system and the moment thereof. As the conclusion of the mechanical inference, a point where the pitch axis moment and the roll axis moment are equal to zero, or the "ZMP (zero moment point)", is present on or inwardly of a side of a supporting polygon defined by the touchdown points of the foot sole and the floor surface.

The majority of the proposals so far made in connection with the orientation stability control of the legged mobile robot and with the prevention of falldown during walking rely upon this ZMP as a criterium for verification of the walking stability. The generation of the two leg walking pattern derived from the ZMP criterium has such merits that the foot sole touchdown point can be pre-set and that the kinetic constraint conditions for the foot sole in meeting with the floor surface shape can readily be taken into account. Moreover, the use of ZMP as the criterium for verification of the walking stability means that not the force but the trajectory is to be handled as the target value for kinetic control, thus indicating increased technical feasibility. Meanwhile, the application of the ZMP concept and use of the ZMP as the criterium for verification of stability of the mobile robot is discussed in Miomir Vukobratovic, LEGGED LOCOMOTIVE ROBOTS" (Ichiro Kato et al., "Movable robot and artificial leg", published by Nikkan Kogyo Shimbun-sha.

In general, a two-legged mobile robot, such as humanoid robot apparatus, is higher in its center of gravity and narrower in ZMP stability area during walking than the four-legged robot. Consequently, the problem of orientation control brought about by changes in the floor surface state is particularly crucial with two-legged mobile robots.

With the humanoid robot apparatus 200, described above, the sub-controllers 335, 345, . . . interpret the commands received from the main controller 381 and output driving control signals to the respective actuators $A2$, $A_3$ . . . to control the driving of the respective units. This permits stable transition of the humanoid robot apparatus 200 to a targeted orientation to permit the humanoid robot apparatus to walk in stabilized orientation.

Moreover, the control unit 380 in the humanoid robot apparatus 200 not only performs orientation control as described above but also comprehensively processes the image information from the various sensors, such as acceleration sensor, touch sensor or touchdown conformation sensor, the image information from the CCD camera or the speech information from the microphone. In the control unit 380, the various sensors, such as acceleration sensor, touch sensor or touchdown conformation sensor, various actuators, CCD camera and the battery are connected to the main controller 381 via associated hubs.

The main controller 381 sequentially captures the sensor data or image data, supplied from the aforementioned respective sensors, to sequentially store these data over internal interfaces in preset locations in a DRAM. The main controller 381 sequentially captures the residual battery capacity data, supplied from the battery, to store the data in preset locations in the DRAM. The sensor data, image data, speech data and the residual battery capacity data, thus stored in the DRAM, are exploited when the main controller 381 controls the movement of the humanoid robot apparatus 200.

In an initial stage when the power supply of the humanoid robot apparatus 200 is turned on, the main controller 381 reads out the control program to store the read-out program in the DRAM. The main controller 381 also verifies the own and surrounding states, or whether or not a command or an action from the user has been made, based on the various sensor data, image data, speech data and on the residual battery capacity data, sequentially stored in the DRAM. Additionally, the main controller 381 determines the robot's action, responsive to its state, based on the verified results and on the control program stored in the DRAM, while causing the actuators to be driven as necessary based on the determined results to cause the humanoid robot apparatus 200 to take the actions such as body or hand gesture or movements.

Thus, the humanoid robot apparatus 200 is able to verify its own state and the surrounding state, based on the control program, and to act autonomously responsive to the command and action from the user. The humanoid robot apparatus 200 also determines the way of pronunciation (reading) of the letters or characters extracted from the image, photographed by the CCD camera, based on the matching of the reading as inferred from the extracted letters or characters and the speech as collected by the sound collecting microphone. The result is that the speech recognition by the humanoid robot apparatus 200 is improved in accuracy such that new words can beregistered in the dictionary for speech recognition.

INDUSTRIAL APPLICABILITY

As described above, the robot apparatus according to the present invention includes a robot apparatus acting autonomously based on an inner state of the robot apparatus, including storage means for speech recognition, as a dictionary for speech recognition, having stored therein the relationship of correspondence between a word and the pronunciation information thereof, word sound expression storage means, as a table for word sound expressions, having stored therein the relationship of correspondence between the word and the word reading expressing letters thereof, imaging means for photographing an object, image recognition means for extracting the predetermined patterns of images from the image photographed by the imaging means, sound collecting means for acquiring the surrounding sound, speech recognition means for recognizing the speech from the sound collected by the sound collecting means, reading information generating means for conferring plural word reading expressing letters, inferred from the predetermined patterns of images extracted by the image recognition means, based on the table for word sound expressions, and for generating the pronunciation information for each of the plural word reading expressing letters or characters thus conferred, and storage controlling means for comparing the pronunciation information generated by the reading information generating means to the speech information of the speech recognized by the speech recognition means and newly storing the closest pronunciation information in the dictionary for speech recognition as being the pronunciation information corresponding to the pattern recognition result extracted by the image recognition measn.

With the robot apparatus according to the present invention, a plural number of the phonograms, inferred from the predetermined patterns of images, extracted from the image photographed by imaging means, are conferred based on a table of word expressing sound, the pronunciation information for each of plural phonograms conferred is generated, and the respective pronunciation information generated by the pronunciation information generating means are compared to the speech information recognized by the speech recognition means to determine the closest speech waveform as being the pronunciation information corresponding to the pattern recognition result extracted.

Thus, with the robot apparatus of the present invention, it is possible to suppress adverse effects due to mistaken recognition of the pronunciations containing weak phonemes, for example, /s/ at the word leading end, changes in the input phonemes caused by the surrounding noise, or to failure in detecting the speech domains, thereby improving the recognition accuracy in registering new words. This allows to store the correct pronunciation information in the dictionary for speech recognition, thus improving the accuracy in recognizing the word registered as a new word.

The robot apparatus of the present invention includes word information storage means, in which the word information comprised of words, the phonograms for the words and the word attributes, are stored as a word attribute table. The storage controlling means memorizes letters or characters to be newly stored, and the pronunciation information for the new letters or characters, in association with the corresponding word attributes.

Consequently, with the robot apparatus of the present invention, it is unnecessary for the user to input the word attribute information, required in applying the grammatical rules or dialog rules to the input or output speech, thus improving the ease in using the apparatus. Additionally, even if the user is not apprized of the attribute information, it may be input, thus again improving the ease in using the apparatus.

The letter/character recognition device according to the present invention includes storage means for speech recognition, as a dictionary for speech recognition, having stored therein the relationship of correspondence between a word and the pronunciation information thereof, word sound expression storage means, as a table for word sound expressions, having stored therein the relationship of correspondence between the word and the word reading expressing letters thereof, imaging means for photographing an object, letter/character recognition means for extracting the letters or characters from the image photographed by the imaging means, sound collecting means for acquiring the surrounding sound, speech recognition means for recognizing the speech from the sound collected by the sound collecting means, reading information generating means for conferring plural word reading expressing letters, inferred from the predetermined patterns of images extracted by the image recognition means, based on the table for word sound expressions, and for generating the pronunciation information for each of the plural word reading expressing letters or characters thus conferred, and storage controlling means for comparing the speech waveforms generated by the reading information generating means to the pronunciation information of the speech recognized by the speech recognition means and newly storing the closest pronunciation information in the dictionary for speech recognition as being the pronunciation information corresponding to the pattern recognition result extracted by the image recognition means.

Thus, with the letter/character recognition device of the present invention, it is possible to suppress adverse effects due to mistaken recognition of the pronunciations containing weak phonemes, for example, /s/ at the word leading end, changes in the input phonemes caused by the surrounding noise, or to failure in detecting the speech domains, to improve the recognition accuracy in registering new words. This allows to store the correct pronunciation information in the dictionary for speech recognition, thus improving the accuracy in recognizing the word registered as a new word.

The letter/character recognition device of the present invention includes word information storage means, in which the word information comprised of words, the phonograms for the words and the word attributes, are stored as a word attribute table. The storage controlling means memorizes letters or characters to be newly stored, and the pronunciation information for the new letters or characters, in association with the corresponding word attributes.

Consequently, with the letter/character recognition device of the present invention, it is unnecessary for the user to input the word attribute information, required in applying the grammatical rules or dialog rules to the input or output speech, thus improving the ease in using the apparatus. Additionally, even if the user is not apprized of the attribute information, it may be input, thus again improving the ease in using the apparatus.

The image recognition method according to the present invention includes an imaging step of imaging an object, a letter/character recognition step of extracting predetermined patterns of images from an image photographed by the imaging step, a sound collecting step of collecting the surrounding sound, a speech recognition step of recognizing the speech from the sound acquired by the sound collecting step, a reading information generating step of conferring plural word reading expressing letters, inferred from the predetermined patterns of images extracted by the image recognition step, based on a table for word sound expressions, having stored therein the relationship of correspondence between a word and a sound expressing letter/character for the word, and of generating the pronunciation information for each of the plural word reading expressing letters or characters thus conferred, and a storage controlling step of comparing the pronunciation information generated by the reading information generating step to the speech information of the speech recognized by the speech recognition step and newly storing the closest pronunciation information in the dictionary for speech recognition as being the pronunciation information corresponding to the pattern recognition result extracted by the image recognition step.

Thus, with the letter/character recognition method of the present invention, it is possible to suppress adverse effects due to mistaken recognition of the pronunciations containing weak phonemes, for example, /s/ at the word leading end, changes in the input phonemes caused by the surrounding noise, or to failure in detecting the speech domains, to improve the recognition accuracy in registering new words. This allows to store the correct pronunciation information in the dictionary for speech recognition, thus improving the accuracy in recognizing the word registered as a new word.

The letter/character recognition method of the present invention includes word information storage means, in which the word information comprised of words, the phonograms for the words and the word attributes, are stored as a word attribute table. The storage controlling step memorizes letters or characters to be newly stored, and the pronunciation information for the new letters or characters, in association with the corresponding word attributes.

Consequently, with the letter/character recognition method of the present invention, it is unnecessary for the user to input the word attribute information, required in applying the grammatical rules or dialog rules to the input or output speech, thus improving the ease in using the apparatus. Additionally, even if the user is not apprized of the attribute information, it may be input, thus again improving the ease in using the apparatus.

Moreover, the control program according to the present invention allows for having a robot apparatus execute an imaging step of imaging an object, an image recognition step of extracting predetermined patterns of images from an image photographed by the imaging step, a sound collecting step of collecting the surrounding sound, a speech recognition step of recognizing the speech from the sound acquired by the sound collecting step, reading information generating means for conferring plural word reading expressing letters, inferred from the letters or characters extracted by the letter/character recognition means, based on a table for word sound expressions, having stored therein the relationship of correspondence between a word and a sound expressing letter/character for the word, and for generating the pronunciation information for each of the plural word reading expressing letters or characters thus conferred, and storage controlling means for comparing the pronunciation information generated by the reading information generating means to the speech information of the speech recognized by the speech recognition means and newly storing the closest pronunciation information in the dictionary for speech recognition as being the pronunciation information corresponding to the pattern recognition result extracted by the image recognition means.

Thus, with the control program of the present invention, it is possible to suppress adverse effects due to mistaken recognition of the pronunciations containing weak phonemes, for example, /s/ at the word leading end, changes in the input phonemes caused by the surrounding noise, or to failure in detecting the speech domains, to improve the recognition accuracy in registering new words. This allows to store the correct pronunciation information in the dictionary for speech recognition, thus improving the accuracy in recognizing the word registered as a new word.

By recording the above control program on a recording medium and providing the control program in this form, it is possible to improve the recognition accuracy with which new words are registered for an electronic equipment that is able to read in this recording medium and that includes image recognition means and speech recognition means. Since the correct pronunciation information may be memorized, it is possible to recognize the accuracy in recognition of words registered as new words.

The invention claimed is:

1. A robot apparatus acting autonomously based on an inner state of the robot apparatus, comprising:

storage means for speech recognition, as a dictionary for speech recognition, having stored therein the relationship of correspondence between a word and the pronunciation information thereof;

word sound expression storage means, as a table for word sound expressions, having stored therein the relationship of correspondence between the word and the word reading expressing letters thereof;

imaging means for photographing an object;

image recognition means for extracting the predetermined patterns of images from the image photographed by said imaging means;

sound collecting means for acquiring the surrounding sound;

speech recognition means for recognizing the speech from the sound collected by said sound collecting means;

reading information generating means for conferring plural word reading expressing letters, inferred from the predetermined patterns of images extracted by said image recognition means, based on said table for word sound expressions, and for generating the pronunciation information corresponding to the reading for each of the plural word reading expressing letters or characters thus conferred; and storage controlling means for comparing the pronunciation information generated by said reading information generating means to the pronunciation information of the speech recognized by said speech recognition means and newly storing the closest information of pronunciation in said dictionary for speech recognition as being the pronunciation information corresponding to the pattern recognition result extracted by said image recognition means.

2. The robot apparatus as recited in claim 1 further comprising:

transient storage means, as a transient dictionary, for transiently storing the correspondence between a plurality of letters extracted from said image and a plurality of information of pronunciation conferred to said letters or characters.

3. The robot apparatus as recited in claim 1 further comprising:
word information storage means, as word attribute table, having stored therein the word information including a word, word reading expressing letters for said word and an attribute of said word, said storage controlling means causing said word attribute to be stored in said dictionary for speech recognition in association with said letter or character being newly registered and the pronunciation information of said letter or character.

4. The robot apparatus as recited in claim 3 further comprising:
dialog management means for generating a reply to the speech recognized by said speech recognition means; said dialog management means employing said word attribute in reply rules to the speech.

5. The robot apparatus as recited in claim 1 wherein said speech recognition means recognizes the speech based on the hidden Markov model method.

6. A letter/character recognition device comprising:
storage means for speech recognition, as a dictionary for speech recognition, having stored therein the relationship of correspondence between a word and the pronunciation information thereof;
word sound expression storage means, as a table for word sound expressions, having stored therein the relationship of correspondence between the word and the word reading expressing letters thereof;
imaging means for photographing an object;
image recognition means for extracting the predetermined patterns of images from the image photographed by said imaging means;
sound collecting means for acquiring the surrounding sound;
speech recognition means for recognizing the speech from the sound collected by said sound collecting means;
reading information generating means for conferring plural word reading expressing letters, inferred from the predetermined patterns of images extracted by said image recognition means, based on said table for word sound expressions, and for generating the pronunciation information for each of the plural word reading expressing letters or characters thus conferred; and
storage controlling means for comparing the pronunciation information generated by said reading information generating means to the speech information of the speech recognized by said speech recognition means and newly storing the closest information of pronunciation in said dictionary for speech recognition as being the pronunciation information corresponding to the pattern recognition result extracted by said image recognition means.

7. The letter/character recognition device as recited in claim 6 further comprising:
transient storage means, as a transient dictionary, for transiently storing the correspondence between a plurality of letters extracted from said image and a plurality of information of pronunciation conferred to said letters or characters.

8. The letter/character recognition device as recited in claim 6 further comprising:
word information storage means, as word attribute table, having stored therein the word information including a word, word reading expressing letters for said word and an attribute of said word, said storage controlling means causing said word attribute to be stored in said dictionary for speech recognition in association with said letter or character being newly registered and the pronunciation information of said letter or character.

9. The letter/character recognition device as recited in claim 8 further comprising:
dialog management means for generating a reply to the speech recognized by said speech recognition means; said dialog management means employing said word attribute in reply rules to the speech.

10. The letter/character recognition device as recited in claim 6 wherein said speech recognition means recognizes the speech based on the hidden Markov model method.

11. A letter/character recognition method comprising:
an imaging step of imaging an object;
an image recognition step of extracting predetermined patterns of images from an image photographed by said imaging step;
a sound collecting step of collecting the surrounding sound;
a speech recognition step of recognizing the speech from the sound acquired by said sound collecting step;
a reading information generating step of conferring plural word reading expressing letters, inferred from the predetermined patterns of images extracted by said image recognition step, based on a table for word sound expressions, having stored therein the relationship of correspondence between a word and a sound expressing letter/character for said word, and for generating the pronunciation information for each of the plural word reading expressing letters or characters thus conferred; and
a storage controlling step of comparing the pronunciation information generated by said reading information generating means to the speech information of the speech recognized by said speech recognition step and newly storing the closest information of pronunciation in said dictionary for speech recognition as being the pronunciation information corresponding to the pattern recognition result extracted by said image recognition step.

12. The letter/character recognition method as recited in claim 11 further comprising:
a transient storage step of transiently storing the correspondence between a plurality of letters extracted from said image and a plurality of information of pronunciation conferred to said letters or characters as a transient dictionary.

13. The letter/character recognition method as recited in claim 11 wherein, in said storage controlling step, a word attribute is stored in said dictionary for speech recognition in association with said letter or character being newly registered and the pronunciation information of said letter or character.

14. The letter/character recognition method as recited in claim 13 further comprising:
a dialog management step for generating a reply to the speech recognized by said speech recognition step; said dialog management step employing said word attribute in reply rules to the speech.

15. The letter/character recognition method as recited in claim 11 wherein said speech recognition step recognizes the speech based on the hidden Markov model method.

16. A computer readable medium having stored therein a control program for having a robot apparatus execute an imaging step of imaging an object;

an image recognition step of extracting predetermined patterns of images from an image photographed by said imaging step;

a sound collecting step of collecting the surrounding sound;

a speech recognition step of recognizing the speech from the sound acquired by said sound collecting step;

an pronunciation information generating step of conferring plural word reading expressing letters, inferred from the predetermined patterns of images extracted by said image recognition step, based on a table for word sound expressions, having stored therein the relationship of correspondence between a word and a sound expressing letter/character for said word, and for generating, for each of the plural word reading expressing letters or characters thus conferred, the pronunciation information; and a storage step of comparing the pronunciation information generated by said reading information generating means to the speech information of the speech recognized by said speech recognition step and newly storing the closest information of pronunciation in said dictionary for speech recognition as being the pronunciation information corresponding to the pattern recognition result extracted by said image recognition step.

17. A computer readable medium having recorded therein a control program for having a robot apparatus execute an imaging step of imaging an object;

an image recognition step of extracting predetermined patterns of images from an image photographed by said imaging step;

a sound collecting step of collecting the surrounding sound;

a speech recognition step of recognizing the speech from the sound acquired by said sound collecting step;

an pronunciation information generating step of conferring plural word reading expressing letters, inferred from the predetermined patterns of images extracted by said image recognition step, based on a table for word sound expressions, having stored therein the relationship of correspondence between a word and a sound expressing letter/character for said word, and for generating the pronunciation information for each of the plural word reading expressing letters or characters thus conferred; and a storage step of comparing the pronunciation information generated by said pronunciation information generating step to the speech information of the speech recognized by said speech recognition step and newly storing the closest information of pronunciation in said dictionary for speech recognition as being the pronunciation information corresponding to the pattern recognition result extracted by said image recognition step.

* * * * *